(12) United States Patent
Song et al.

(10) Patent No.: US 11,899,399 B2
(45) Date of Patent: Feb. 13, 2024

(54) BEAM DEFLECTION APPARATUS AND HOLOGRAPHIC DISPLAY APPARATUS INCLUDING THE SAME

(71) Applicant: SAMSUNG ELECTRONICS CO., LTD., Suwon-si (KR)

(72) Inventors: Hoon Song, Yongin-si (KR); Byonggwon Song, Seoul (KR); Yunhee Kim, Seoul (KR); Chilsung Choi, Suwon-si (KR); Jong-Young Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 199 days.

(21) Appl. No.: 17/505,823

(22) Filed: Oct. 20, 2021

(65) Prior Publication Data
US 2022/0163920 A1  May 26, 2022

(30) Foreign Application Priority Data

Nov. 23, 2020 (KR) .......................... 10-2020-0158030
Jan. 28, 2021 (KR) .......................... 10-2021-0012636

(51) Int. Cl.
*G03H 1/22* (2006.01)
*G02B 5/30* (2006.01)
(Continued)

(52) U.S. Cl.
CPC ......... *G03H 1/2294* (2013.01); *G02B 5/3083* (2013.01); *G02B 27/005* (2013.01);
(Continued)

(58) Field of Classification Search
CPC .................................................. G03H 1/2294
See application file for complete search history.

(56) References Cited

U.S. PATENT DOCUMENTS 9,720,246 B2  8/2017  Won et al.
10,210,823 B2  2/2019  Kim et al.
(Continued)

FOREIGN PATENT DOCUMENTS

JP        3778966 B2      5/2006
KR     1020140135561 A   11/2014
(Continued)

OTHER PUBLICATIONS

Communication dated Mar. 28, 2022 issued by the European Patent Office in application No. 21203489.6.
(Continued)

*Primary Examiner* — Edmond C Lau
(74) *Attorney, Agent, or Firm* — Sughrue Mion, PLLC

(57) ABSTRACT

A beam deflection apparatus includes a first beam deflector that deflects light in a first direction and a second beam deflector that deflects light in a second direction perpendicular to the first direction, wherein the first beam deflector and the second beam deflector each include a first region for deflecting light of a first wavelength and a second region for deflecting light of a second wavelength, and a ratio of a spatial period of a signal applied to first drive electrodes arranged in the first region of the first beam deflector to the first wavelength is the same as a ratio of a spatial period of a signal applied to second drive electrodes arranged in the second region of the first beam deflector to the second wavelength.

14 Claims, 19 Drawing Sheets

(51) Int. Cl.
G02B 27/00 (2006.01)
G02F 1/29 (2006.01)
G06F 3/01 (2006.01)
(52) U.S. Cl.
CPC ............ G02F 1/29 (2013.01); G03H 1/2202 (2013.01); G06F 3/013 (2013.01); *G03H 2223/17* (2013.01); *G03H 2223/23* (2013.01); *G03H 2225/00* (2013.01)

(56) References Cited

U.S. PATENT DOCUMENTS

| | | | |
|---|---|---|---|
| 10,788,727 | B2 | 9/2020 | Kim et al. |
| 10,884,240 | B2 | 1/2021 | Song et al. |
| 11,144,010 | B2 | 10/2021 | Kim et al. |
| 2014/0055692 | A1 | 2/2014 | Kroll et al. |
| 2017/0200423 | A1 | 7/2017 | Kim et al. |
| 2018/0129105 | A1 | 5/2018 | Kim et al. |
| 2019/0257993 | A1* | 8/2019 | Kim .................... G02B 5/30 |
| 2019/0294109 | A1* | 9/2019 | Lee .................... G03H 1/2294 |
| 2019/0331980 | A1* | 10/2019 | Kim .................... G02F 1/29 |
| 2020/0285110 | A1 | 9/2020 | Won et al. |
| 2021/0318480 | A1 | 10/2021 | Hong et al. |

FOREIGN PATENT DOCUMENTS

| | | |
|---|---|---|
| KR | 1020180052356 A | 5/2018 |
| KR | 1020200018180 A | 2/2020 |

OTHER PUBLICATIONS

Kim, Y.-T., et al., "Holographic Augmented Reality Head-Up Display with Eye Tracking and Steering Light Source", The 23rd IDW, Dec. 9, 2016, DES4/3D8-3, pp. 1308-1311.

\* cited by examiner

BEAM DEFLECTION APPARATUS AND HOLOGRAPHIC DISPLAY APPARATUS INCLUDING THE SAME

CROSS-REFERENCE TO RELATED APPLICATIONS

This application is based on and claims priority under 35 U.S.C. § 119 to Korean Patent Application No. 10-2020-0158030, filed on Nov. 23, 2020 and Korean Patent Application No. 10-2021-0012636, filed on Jan. 28, 2021, in the Korean Intellectual Property Office, the disclosures of which are incorporated by reference herein in their entireties.

BACKGROUND

1. Field

The disclosure relates to a beam deflection apparatus and a holographic display apparatus including the same, and more particularly, to a beam deflection apparatus with reduced chromatic aberration and a holographic display apparatus including the same.

2. Description of the Related Art

A holographic display technology has recently been studied in relation to a three-dimensional image display method to provide a full parallax by matching a sense of depth perceived by the brain with a focus of eye. Previously used holographic display technologies operate on the principle that an image of an original object is reproduced while reference light diffracts through a hologram pattern when the reference light is emitted again onto the hologram pattern. The hologram pattern is obtained by recording, on a photosensitive film, an interference pattern generated by interference of object light reflected from the original object and reference light. On the other hand, a holographic display technology that has been recently studied provides a computer-generated hologram (CGH) of a three-dimensional image to be displayed as an electrical signal to a spatial light modulator. When a reference light is emitted to the spatial light modulator having a hologram pattern formed according to an input CGH signal, the reference light may be diffracted through the hologram pattern to reproduce a three-dimensional image.

SUMMARY

Provided are a beam deflection apparatus with reduced chromatic aberration and a holographic display apparatus including the same.

Additional aspects will be set forth in part in the description which follows and, in part, will be apparent from the description, or may be learned by practice of embodiments of the disclosure.

According to an aspect of an embodiment, a beam deflection apparatus includes a first beam deflector including a first region and a second region for respectively deflecting light of a first wavelength and light of a second wavelength in a first direction; and a second beam deflector including a first region and a second region for respectively deflecting the light of the first wavelength and the light of the second wavelength in a second direction perpendicular to the first direction, wherein the first beam deflector may include a plurality of first drive electrodes and a plurality of second drive electrodes in the first region and the second region, respectively, and a ratio of a spatial period of a signal applied to the plurality of first drive electrodes arranged in the first region of the first beam deflector to the first wavelength may be the same as a ratio of a spatial period of a signal applied to the plurality of second drive electrodes arranged in the second region of the first beam deflector to the second wavelength. In accordance with an aspect of the disclosure, a beam deflection apparatus includes a first beam deflector including a first region that deflects light of a first wavelength in a first direction and a second region that deflects light of a second wavelength in the first direction; and a second beam deflector including a third region that deflects the light of the first wavelength in a second direction and a fourth region that deflects the light of the second wavelength in the second direction, the second direction being perpendicular to the first direction, wherein the first beam deflector includes a plurality of first drive electrodes and a plurality of second drive electrodes in the first region and the second region, respectively, and wherein a ratio of a spatial period of a signal applied to the plurality of first drive electrodes to the first wavelength is the same as a ratio of a spatial period of a signal applied to the plurality of second drive electrodes to the second wavelength.

The plurality of first drive electrodes may extend in the second direction and may be arranged at intervals in the first direction, and the plurality of second drive electrodes extend in the second direction and is arranged at intervals in the first direction, and a first voltage may be independently applied to the plurality of first drive electrodes and a second voltage may be independently applied to the plurality of second drive electrodes.

The first beam deflector may include a plurality of the first regions and a plurality of the second regions which are alternately arranged in the second direction, and each of the plurality of first regions and each of the plurality of second regions may extend in the first direction in the first beam deflector.

The first beam deflector may further include a substrate; a plurality of connection electrodes arranged on the substrate; and an interlayer insulating layer arranged to cover the substrate and the plurality of connection electrodes, wherein the plurality of first drive electrodes and the plurality of second drive electrodes are arranged on the interlayer insulating layer.

The plurality of connection electrodes may extend in the second direction over the first region and the second region of the first beam deflector and is arranged in the first direction.

The plurality of connection electrodes may include a plurality of first connection electrodes connected to the plurality of first drive electrodes and a plurality of second connection electrodes connected to the plurality of second drive electrodes, and the plurality of first connection electrodes and the plurality of second connection electrodes may be alternately arranged in the first direction.

One of the plurality of first drive electrodes may face one of the plurality of first connection electrodes and one of the plurality of second connection electrodes, and one of the plurality of second drive electrodes may face one of the plurality of first connection electrodes and one of the plurality of second connection electrodes.

The first beam deflector may further include a plurality of via holes penetrating the interlayer insulating layer, each of the plurality of via holes electrically connecting one of the plurality of first drive electrodes and the plurality of second drive electrodes to one of the plurality of first connection electrodes and the plurality of second connection electrodes, and each of the plurality of first connection electrodes may be electrically connected to the plurality of first drive electrodes through the plurality of via holes in the first region of the first beam deflector without being electrically connected to any of the plurality of second drive electrodes, and each of the plurality of second connection electrodes may be electrically connected to the plurality of second drive electrodes through the plurality of via holes in the second region of the first beam deflector without being electrically connected to any of the plurality of first drive electrodes.

A first arrangement period of the plurality of first drive electrodes in the first direction may be different from a second arrangement period of the plurality of second drive electrodes in the first direction, and a ratio of the first arrangement period to the first wavelength may be the same as a ratio of the second arrangement period to the second wavelength.

The second beam deflector may include a plurality of third drive electrodes extending in the first direction and arranged at intervals in the second direction, and a ratio of a spatial period of a signal applied to the plurality of third drive electrodes arranged in the third region to the first wavelength may be the same as a ratio of a spatial period of a signal applied to the plurality of third drive electrodes arranged in the fourth region to the second wavelength.

The second beam deflector may include a plurality of the third regions and a plurality of the fourth regions which are alternately arranged in the second direction, the plurality of third regions and the plurality of fourth regions may extend in the first direction, and some of the plurality of third drive electrodes may be arranged in the plurality of third regions and some of the plurality of third drive electrodes may be arranged in the plurality of fourth regions.

A first signal having a first period may be applied to the plurality of third drive electrodes arranged in the plurality of third regions, and a second signal having a second period different from the first period may be applied to the plurality of third drive electrodes arranged in the plurality of fourth regions, and a ratio of the first period to the first wavelength may be the same as a ratio of the second period to the second wavelength.

The beam deflection apparatus may further include a common substrate; and a halfwave plate, wherein the first beam deflector is arranged on a first surface of the common substrate, and the second beam deflector is arranged on a second surface of the common substrate facing the first surface, and wherein the halfwave plate is arranged on the first surface of the common substrate or the second surface of the common substrate.

At least one of the first beam deflector and the second beam deflector may further include a first color filter arranged in the first region or the third region, respectively, that transmits only light of the first wavelength and a second color filter arranged in the second region or the fourth region, respectively, that transmits only light of the second wavelength.

In accordance with an aspect of the disclosure, a holographic display apparatus includes a backlight unit configured to provide illumination light; a spatial light modulator including a first pixel that modulates light of a first wavelength of the illumination light and a second pixel that modulates light of a second wavelength of the illumination light; a first beam deflector including a first region that deflects the light of the first wavelength in a first direction and a second region that deflects the light of the second wavelength in the first direction; and a second beam deflector including a third region that deflects the light of the first wavelength in a second direction and a fourth region that deflects the light of the second wavelength in the second direction, the second direction being perpendicular to the first direction, wherein the first beam deflector includes a plurality of first drive electrodes and a plurality of second drive electrodes in the first region and the second region, respectively, and wherein a ratio of a spatial period of a signal applied to the plurality of first drive electrodes to the first wavelength is the same as a ratio of a spatial period of a signal applied to the plurality of second drive electrodes to the second wavelength.

The plurality of first drive electrodes may extend in the second direction and may be arranged at intervals in the first direction, and the plurality of second drive electrodes may extend in the second direction and may be arranged at intervals in the first direction, and a first voltage may be independently applied to the plurality of first drive electrodes and a second voltage may be independently applied to the plurality of second drive electrodes.

The first beam deflector may include a plurality of the first regions and a plurality of the second regions which are alternately arranged in the second direction, and each of the plurality of first regions and each of the plurality of second regions may extend in the first direction in the first beam deflector.

The first beam deflector may further include a substrate; a plurality of connection electrodes arranged on the substrate; and an interlayer insulating layer arranged to cover the substrate and the plurality of connection electrodes, wherein the plurality of first drive electrodes and the plurality of second drive electrodes are arranged on the interlayer insulating layer.

The plurality of connection electrodes may extend in the second direction over the first region and the second region of the first beam deflector and may be arranged in the first direction.

The plurality of connection electrodes may include a plurality of first connection electrodes connected to the plurality of first drive electrodes and a plurality of second connection electrodes connected to the plurality of second drive electrodes, and the plurality of first connection electrodes and the plurality of second connection electrodes may be alternately arranged in the first direction.

One of the plurality of first drive electrodes may face one of the plurality of first connection electrodes and one of the plurality of second connection electrodes, and one of the plurality of second drive electrodes may face one of the plurality of first connection electrodes and one of the plurality of second connection electrodes.

The first beam deflector may further include a plurality of via holes penetrating the interlayer insulating layer, each of the plurality of via holes electrically connecting one of the plurality of first drive electrodes and the plurality of second drive electrodes to one of the plurality of first connection electrodes and the plurality of second connection electrodes, and each of the plurality of first connection electrodes may be electrically connected to the plurality of first drive electrodes through the plurality of via holes in the first region of the first beam deflector without being electrically connected to any of the plurality of second drive electrodes, and each of the plurality of second connection electrodes may be electrically connected to the plurality of second drive electrodes through the plurality of via holes in the second region of the first beam deflector without being electrically connected to any of the plurality of first drive electrodes.

A first arrangement period of the plurality of first drive electrodes in the first direction may be different from a second arrangement period of the plurality of second drive electrodes in the first direction, and a ratio of the first arrangement period to the first wavelength may be the same as a ratio of the second arrangement period to the second wavelength.

The second beam deflector may include a plurality of third drive electrodes extending in the first direction and arranged at intervals in the second direction, and a ratio of a spatial period of a signal applied to the plurality of third drive electrodes arranged in the third region to the first wavelength may be the same as a ratio of a spatial period of a signal applied to the plurality of third drive electrodes arranged in the fourth region to the second wavelength.

The second beam deflector may include a plurality of the third regions and a plurality of the fourth regions which are alternately arranged in the second direction, the plurality of third regions and the plurality of fourth regions may extend in the first direction, and some of the plurality of third drive electrodes may be arranged in the plurality of third regions and some of the plurality of third drive electrodes may be arranged in the plurality of fourth regions.

A first signal having a first period may be applied to the plurality of third drive electrodes arranged in the plurality of third regions, and a second signal having a second period different from the first period may be applied to the plurality of third drive electrodes arranged in the plurality of fourth regions, and a ratio of the first period to the first wavelength may be the same as a ratio of the second period to the second wavelength.

The first beam deflector may be aligned with the spatial light modulator so that the first region faces the first pixel, and so that the second region faces the second pixel.

The spatial light modulator may be between the backlight unit and the second beam deflector, and the first beam deflector may be between the spatial light modulator and the second beam deflector.

The spatial light modulator may be between the backlight unit and the second beam deflector, and the first beam deflector may be between the backlight unit and the spatial light modulator.

The first beam deflector may be between the backlight unit and the spatial light modulator, and the second beam deflector may be between the first beam deflector and the spatial light modulator.

The first beam deflector and the second beam deflector may contact each other without any interval therebetween, or the second beam deflector and the spatial light modulator may contact each other without any interval therebetween, or the first beam deflector, the second beam deflector, and the spatial light modulator may contact each other without any interval between adjacent ones of the first beam deflector, the second beam deflector, and the spatial light modulator.

The holographic display apparatus may further include a binocular separation grating and a focusing lens that are arranged between the backlight unit and the first beam deflector, between the first beam deflector and the second beam deflector, or between the second beam deflector and the spatial light modulator.

The holographic display apparatus may further include a beam deflector controller configured to change a position of the third region of the second beam deflector and a position of the fourth region of the second beam deflector based on deflection angles of light adjusted by the second beam deflector so that light passing through the third region of the second beam deflector is incident on the first pixel of the spatial light modulator and light passing through the fourth region of the second beam deflector is incident on the second pixel of the spatial light modulator.

The holographic display apparatus may further include an eye tracker for tracking a position of a pupil of an observer, wherein the first beam deflector and the second beam deflector deflect light in response to information on the position of the pupil of the observer, the information being provided from the eye tracker.

In accordance with an aspect of the disclosure, a beam deflection apparatus includes a beam deflector including a plurality of drive electrodes, a first group of the plurality of drive electrodes being positioned in a first region of the beam deflector and a second group of the plurality of drive electrodes being positioned in a second region of the beam deflector; and a beam deflector controller configured to apply a first voltage pattern to the first group and a second voltage pattern to the second group, wherein a first spatial period of the first voltage pattern is different from a second spatial period of the second voltage pattern.

The first region may include a plurality of first regions and the second region may include a plurality of second regions repeatedly and alternately arranged with the plurality of first regions.

The beam deflection apparatus may further include a color filter, wherein the first region corresponds to a first portion of the color filter configured to transmit a first wavelength of light and the second region corresponds to a second portion of the color filter configured to transmit a second wavelength of light different from the first wavelength.

A ratio of the first spatial period to the first wavelength may be different from a ratio of the second spatial period to the second wavelength.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
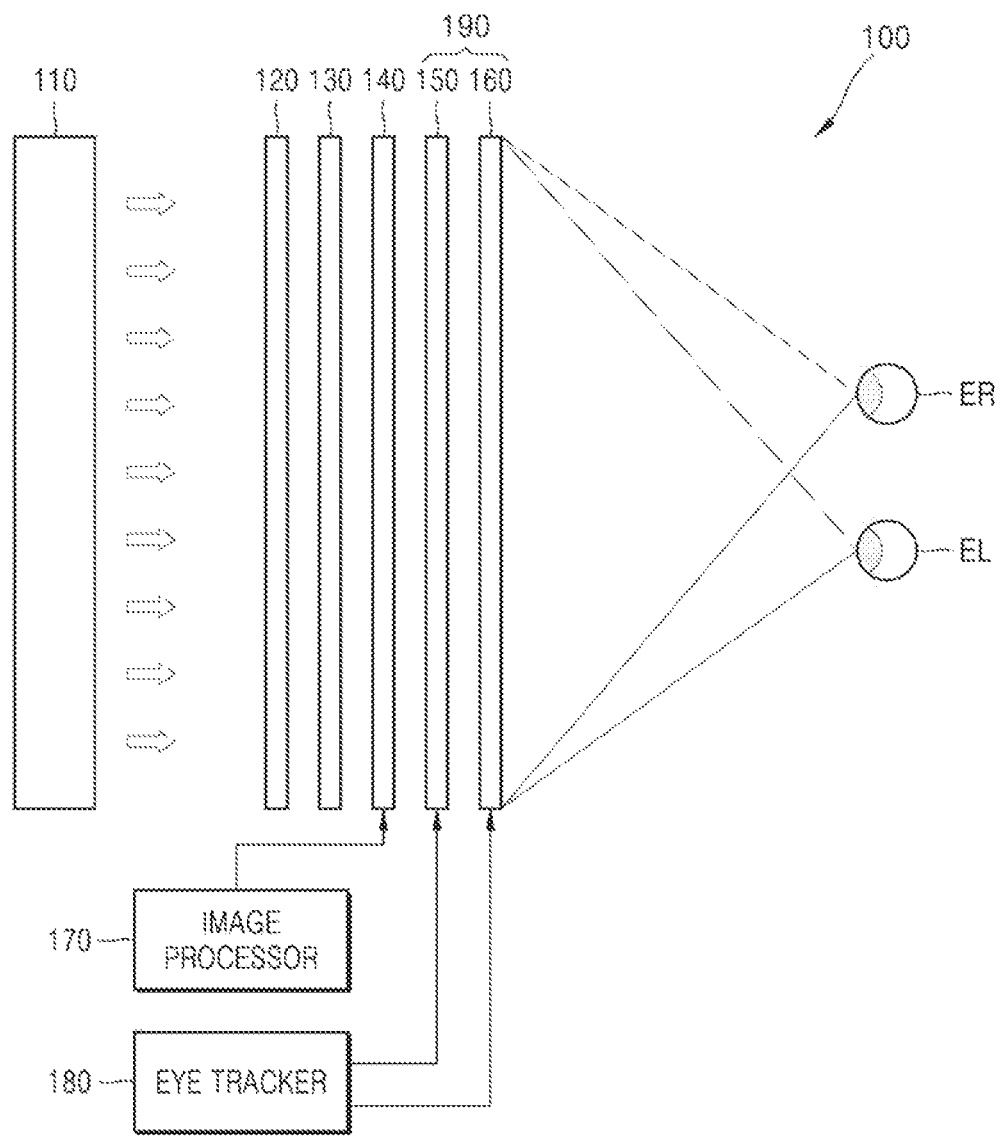
FIG. 1 is a configuration diagram schematically showing a configuration of a holographic display apparatus according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a beam deflection apparatus and a holographic display apparatus including the same will be described in detail with reference to the accompanying drawings. In the following drawings, the same reference numerals refer to the same components, and a size of each component in the drawings may be exaggerated for the sake of clear and convenient description. In addition, embodiments to be described below are merely illustrative, and various modifications may be made from the embodiments.

Hereinafter, what is described as "upper portion" or "on" may include not only a portion thereover in direct contact therewith but also a portion thereover not in contact therewith. Singular expressions include plural expressions unless the context clearly indicates otherwise. In addition, when a portion "includes" a certain component, it means that other components may be further included therein rather than excluding other components unless specifically stated to the contrary.

A term "above-described" and a similar reference term may correspond to both a single term and plural terms. If there is no explicit order or contradictory description of steps constituting a method, the steps may be performed in an appropriate order, and are not limited to the described order.

In addition, terms such as " . . . unit", " . . . portion", and "module" described in the specification mean units that process functions or operations, which may be implemented as hardware or software, or as a combination of hardware and software.

Connections or connection members of lines between components shown in the drawings are examples of functional connections, and/or physical connections or circuit connections, and may appear as various functional connections, physical connections, or circuit connections that may be replaced or added in an actual apparatus.

All examples or illustrative terms are merely for describing technical concepts in detail, and the scope is not limited to the examples or illustrative terms unless limited by the claims.

FIG. 1 is a configuration diagram schematically showing a configuration of a holographic display apparatus according to an embodiment. Referring to FIG. 1, a holographic display apparatus 100 includes a backlight unit 110 that emits illumination light, a spatial light modulator 140 for modulating illumination light emitted from the backlight unit 110 to display a holographic pattern for reproducing a holographic image, and a beam deflection apparatus 190 for adjusting a position of the holographic image by deflecting light according to a position of a pupil of an observer. The holographic display apparatus 100 may further include a binocular separation grating 120 for dividing illumination light into two illumination lights to provide a holographic image to left and right eyes of the observer, respectively, and a focusing lens 130 for focusing the holographic image on a space. In addition, the holographic display apparatus 100 may further include an image processor 170 that generates a hologram signal according to a holographic image to be reproduced and provides the generated hologram signal to the spatial light modulator 140, and an eye tracker 180 that tracks a position of the pupil of the observer.

The backlight unit 110 may provide collimated illumination light having coherency to an entire display surface of the spatial light modulator 140. To this end, the backlight unit 110 may include a light source, a light guide plate, and a light exit structure. The light source of the backlight unit 110 may include a laser diode or a light emitting diode that emits light having spatial coherence.

The binocular separation grating 120 may divide the illumination light emitted from the backlight unit 110 into two illumination lights traveling in different directions. To this end, the binocular separation grating 120 may include a diffraction optical element (DOE) or a holographic optical element (HOE) having a periodic grating structure.

The focusing lens 130 serves as a lens having positive refractive power to focus illumination light. Reproduced light modulated by the spatial light modulator 140 may be focused on a predetermined space by the focusing lens 130 to form an image. For example, the reproduced light may be focused on a position of a pupil of an observer by the focusing lens 130. The focusing lens 130 may also be a general refractive lens and may be a grating-type flat lens having a small thickness. For example, the focusing lens 130 may also be a DOE or an HOE. The focusing lens 130 in the form of a flat lens may reduce a volume of the holographic display apparatus 100.

The spatial light modulator 140 may form a hologram pattern for diffracting and modulating illumination light according to a hologram data signal, for example, a computer generated hologram (CGH) data signal provided from the image processor 170. To this end, the spatial light modulator 140 may include a plurality of display pixels arranged in two dimensions. In addition, the spatial light modulator 140 may use any of a phase modulator capable of performing only phase modulation, an amplitude modulator capable of performing only amplitude modulation, and a composite modulator capable of performing both phase modulation and amplitude modulation. Although FIG. 1 shows that the spatial light modulator 140 is a transmissive spatial light modulator, a reflective spatial light modulator may also be used for the spatial light modulator 140.

The image processor 170 may generate a hologram signal according to a holographic image to be provided to an observer and provide the generated hologram signal to the spatial light modulator 140. In particular, the image processor 170 may generate a left-eye hologram signal for a left-eye holographic image and a right-eye hologram signal for a right-eye holographic image and provide the left-eye hologram signal and the right-eye hologram signal to the spatial light modulator 140. In addition, the image processor 170 may also control an operation of the backlight unit 110. For example, the image processor 170 may control turn-on and turn-off of the backlight unit 110. The image processor 170 may also be implemented by using software or may also be implemented in the form of a semiconductor chip having a software function.

The spatial light modulator 140 may modulate illumination light traveling to a left eye EL of an observer among two illumination lights divided by the binocular separation grating 120 into a left-eye hologram signal to reproduce a left-eye holographic image and may modulate illumination light traveling to a right eye ER of the observer into a right-eye hologram signal to reproduce a right-eye holographic image. Only holographic images of two viewpoints visible in the left eye EL and the right eye ER of the observer are reproduced, and thus, the amount of calculation for generating a hologram signal may be reduced because the image processor 170 does not need to generate the hologram signal having information on all viewpoints.

The eye tracker 180 may obtain an image of the observer through a camera or so on, detect a pupil of the observer in the image, and analyze a position thereof. Alternatively, the eye tracker 180 may analyze the position of the pupil of the observer by irradiating gaze tracking illumination light in an infrared band invisible to eyes of the observer toward the observer and measuring the reflected gaze tracking illumination light. In this way, the eye tracker 180 may track a change in position of the pupil of the observer in real time and provide results thereof to the image processor 170. The image processor 170 may generate a hologram signal of a viewpoint suitable for the position of the pupil of the observer in response to pupil position information of the observer received from the eye tracker 180. In other words, the image processor 170 may generate a hologram signal according to a change in viewpoint due to a change in position of the observer and may provide the hologram signal to the spatial light modulator 140.

In addition, the eye tracker 180 (e.g., beam deflector controller) may control the beam deflection apparatus 190 so that the reproduced left-eye and right-eye holographic images enter the left eye EL and the right eye ER of the observer, respectively. The eye tracker 180 may control the beam deflection apparatus 190 in response to the pupil position information and the beam deflection apparatus 190 may deflect a propagation direction of light in vertical and horizontal directions in response to the pupil position information of the observer received from the eye tracker 180.

To this end, the beam deflection apparatus 190 may include a first beam deflector 150 for deflecting light in the vertical direction in response to the pupil position information of the observer received from the eye tracker 180 and a second beam deflector 160 for deflecting the light in the horizontal direction. The first and second beam deflectors 150 and 160 may operate to form a blazed grating by adjusting an effective refractive index of a liquid crystal layer filled between two transparent substrates according to position in the liquid crystal layer. A propagation direction of light passing through the first and second beam deflectors 150 and 160 may be determined by a period of the blaze grating formed according to a change in the effective refractive index of the liquid crystal layer.

Figure 2A:
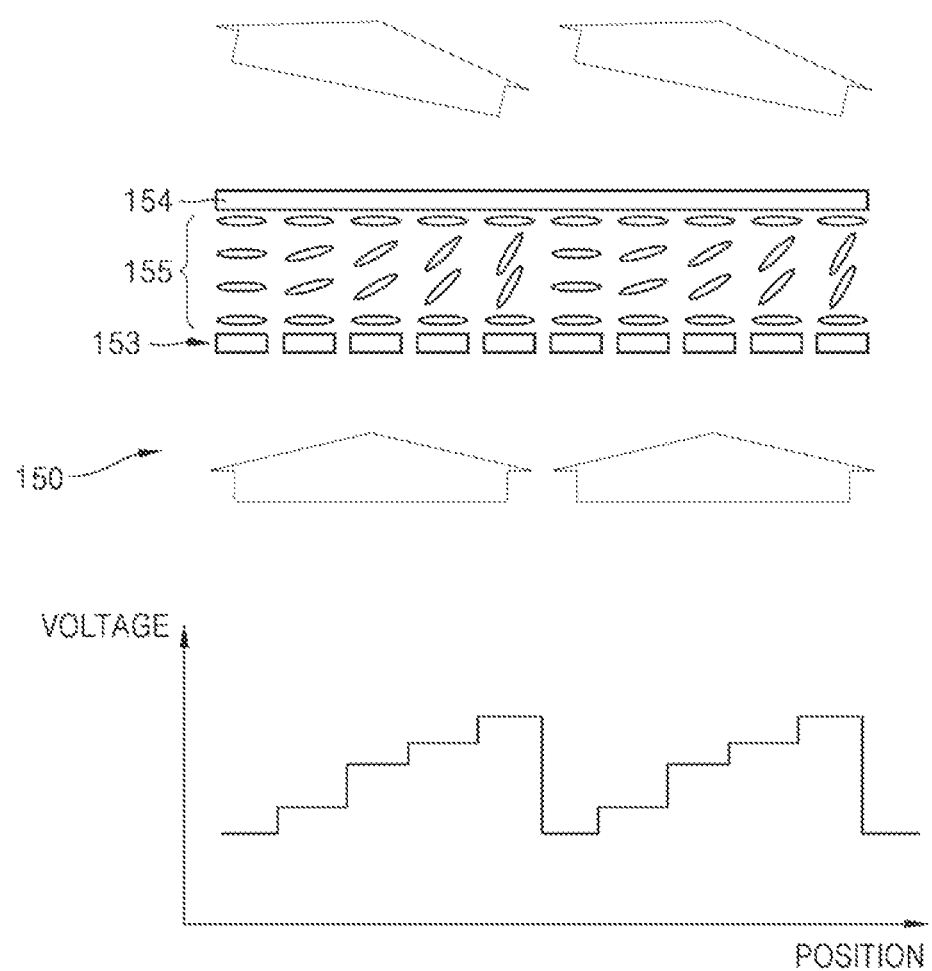
FIGS. 2A and 2B are conceptual diagrams schematically showing a structure and an operation of a first beam deflector.
Figure 2B:
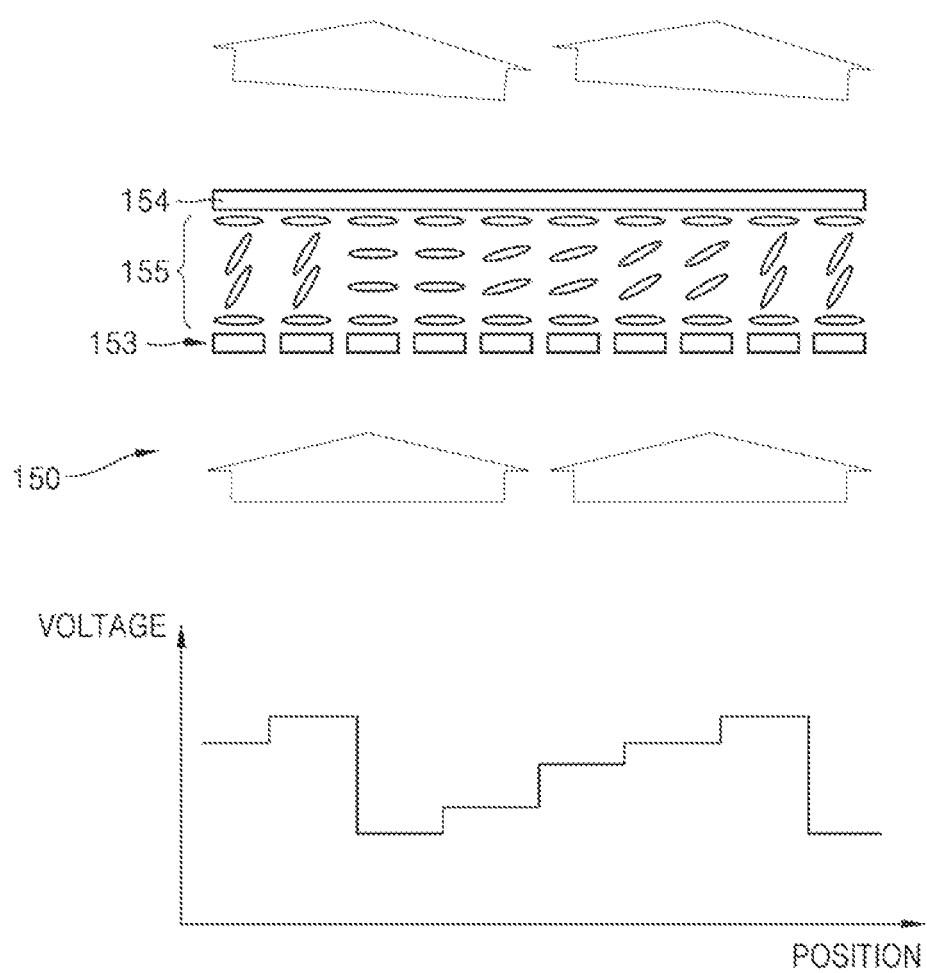

For example, FIGS. 2A and 2B are conceptual diagrams schematically showing a structure and an operation of the first beam deflector 150. Referring to FIGS. 2A and 2B, the first beam deflector 150 may include a plurality of drive electrodes 153, a common electrode 154 arranged to face the drive electrodes 153, and a liquid crystal layer 155 arranged in a space between the drive electrodes 153 and the common electrode 154. Voltages may be independently applied to the respective drive electrodes 153, and an effective refractive index of the liquid crystal layer 155 corresponding to each of the drive electrodes 153 may be changed according to the applied voltages. Accordingly, when a spatially periodic electrical signal is applied to the drive electrodes 153, the effective refractive index of the liquid crystal layer 155 is periodically changed, and the liquid crystal layer 155 may serve as a grating.

For example, when a periodic signal of a stepwise increasing shape is applied to the drive electrodes 153 as shown in graphs at bottoms of FIGS. 2A and 2B, the liquid crystal layer 155 may serve as the blazed grating. In this case, an angle at which light is deflected by the first beam deflector 150 may be determined by a spatial period of a signal applied to the drive electrodes 153 as shown in Equation 1 below.

$$\theta_m = \arcsin\left(\sin\theta_i - \frac{m\lambda}{d}\right) \quad \text{[Equation 1]}$$

Here, m is a diffraction order, $\theta_i$ is an incident angle, $\theta_m$ is a light exit angle of the m-order diffracted light, $\lambda$ is a wavelength of the incident light, and d is a period of the blazed grating or a spatial period of the signal applied to the drive electrodes 153. As can be seen from FIGS. 2A and 2B and Equation 1, when the diffraction order m is an integer greater than or equal to 1, and when the period d is shortened, the angle $\theta_m$ at which light is deflected by the first beam deflector 150 is increased, and when the period d becomes longer, the deflection angle $\theta_m$ is reduced.

The second beam deflector 160 has a structure similar to the structure of the first beam deflector 150 and may operate in the same manner as the above-described principle. Drive electrodes of the second beam deflector 160 may extend in a direction rotated by 90 degrees from an extension direction of the drive electrodes 153 of the first beam deflector 150. Then, the second beam deflector 160 may deflect light in a direction perpendicular to a deflection direction of the first beam deflector 150.

However, as can be seen from Equation 1, the angle $\theta_m$ at which light is deflected is determined by not only the period d but also the wavelength λ of incident light. Although the period d is the same, when the wavelength λ of incident light is increased, the angle θm at which light is deflected is increased. For example, a deflection angle of red light is greater than a deflection angle of blue light in the same period d. Accordingly, when spatial periods of signals applied to the drive electrodes of the first and second beam deflectors 150 and 160 are equal to each other in all regions of the first and second beam deflectors 150 and 160, chromatic aberration may occur, and an observer may also view holographic images in which blue, green, and red are separated.

According to an embodiment, in order to reduce the chromatic aberration, the drive electrodes of the first and second beam deflectors 150 and 160 are aligned with pixels of the spatial light modulator 140, and a signal having a period appropriate to a wavelength of light incident on the regions of the first and second beam deflectors 150 and 160 may be applied to the drive electrodes of the first and second beam deflectors 150 and 160. In particular, according to Equation 1, when a ratio λ/d between the spatial period d of a signal and the wavelength λ of incident light is constant, the angle θm at which light is deflected is also constant. Accordingly, when the ratio λ/d between the spatial period d of the signal and the wavelength λ of the incident light is kept constant in all regions of the first and second beam deflectors 150 and 160, chromatic aberration caused by the first and second beam deflectors 150 and 160 may be minimized.

Figure 3:
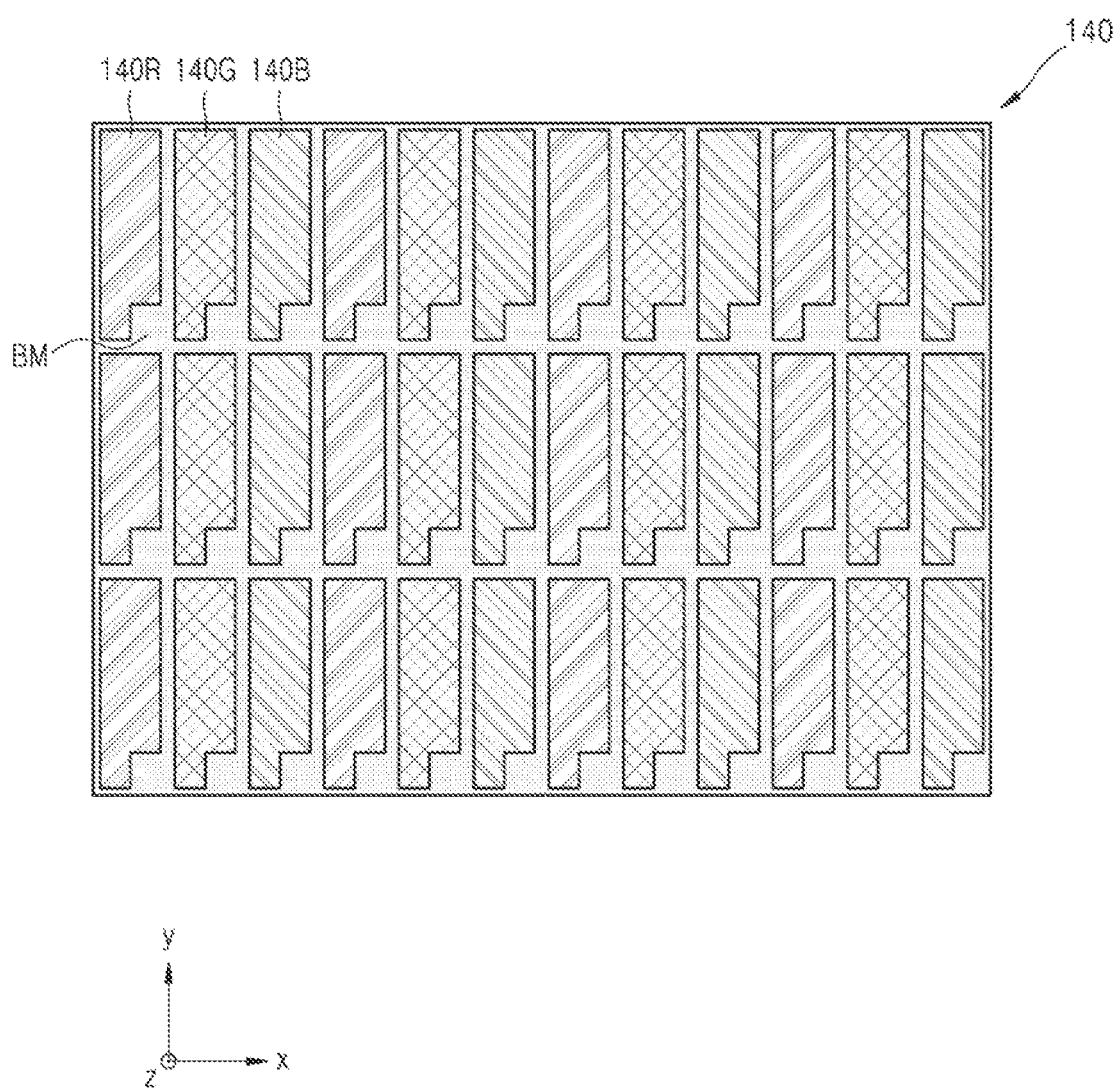
FIG. 3 shows an example of a pixel arrangement of a spatial light modulator.

FIG. 3 shows an example of a pixel arrangement of the spatial light modulator 140. Referring to FIG. 3, the spatial light modulator 140 may include a plurality of pixels arranged in two dimensions. For example, the spatial light modulator 140 may include red pixels 140R, green pixels 140G, and blue pixels 140B repeatedly arranged in the X direction. The same pixels may be arranged in a line in the Y direction perpendicular to the X direction. In other words, a plurality of red pixels 140R may be arranged in a line in the Y direction, a plurality of green pixels 140G may be arranged in a line in the Y direction, and a plurality of blue pixels 140B may be arranged in a line in the Y direction. In addition, the spatial light modulator 140 may further include a black matrix BM arranged between pixels in the X direction and the Y direction.

Figure 4:
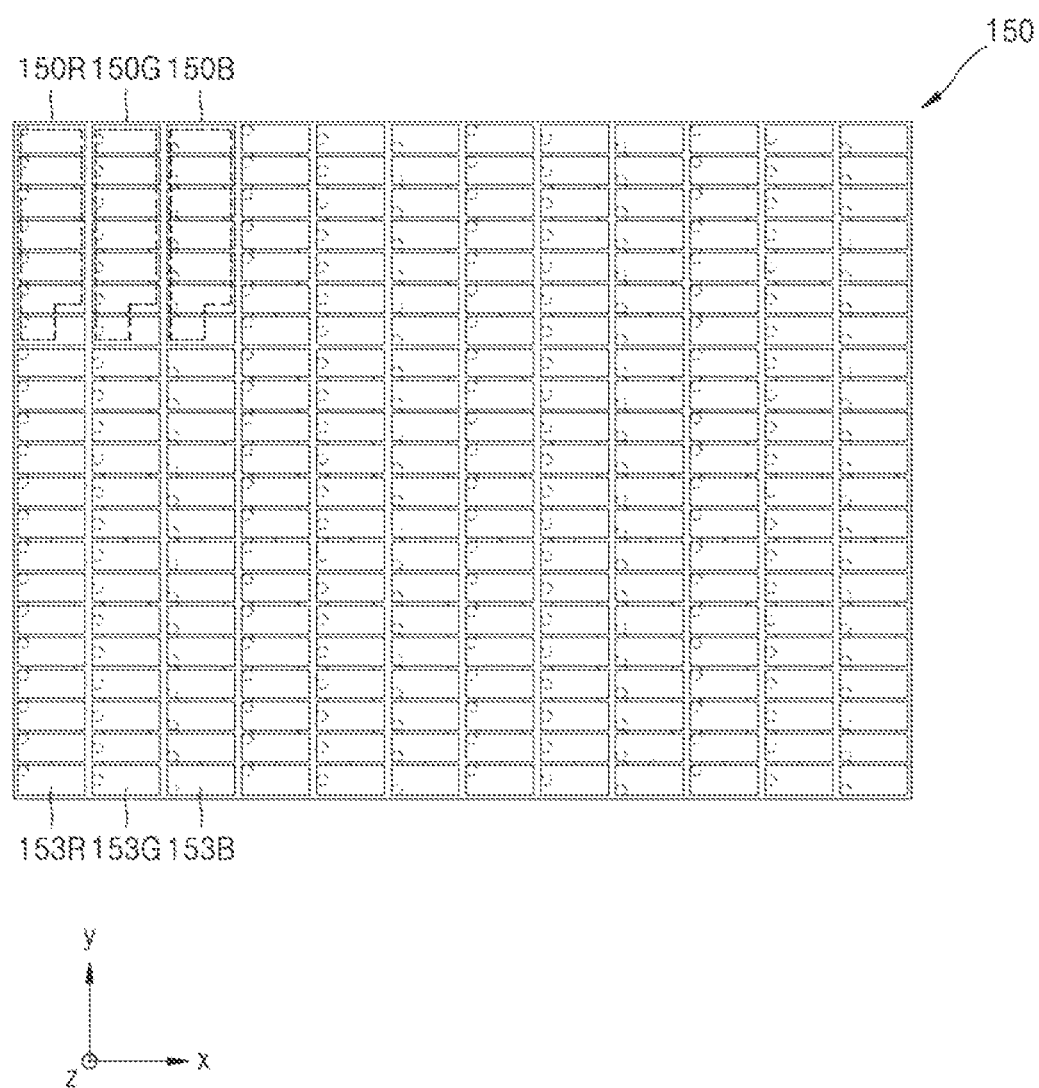
FIG. 4 shows an example of an arrangement of drive electrodes of the first beam deflector aligned with the pixel arrangement of the spatial light modulator shown in FIG. 3.

In order to reduce chromatic aberration, the drive electrodes of the first and second beam deflectors 150 and 160 may be aligned with the pixel arrangement of the spatial light modulator 140 shown in FIG. 3. For example, FIG. 4 shows an example of an arrangement of drive electrodes 153 of the first beam deflector 150 aligned with the pixel arrangement of the spatial light modulator 140 shown in FIG. 3. Referring to FIG. 4, the first beam deflector 150 includes a first region 150R, a second region 150G, and a third region 150B that correspond to and are arranged to face the red pixels 140R, the green pixels 140G, and the blue pixels 140B of the spatial light modulator 140, respectively. In other words, the first region 150R of the first beam deflector 150 is arranged to face the red pixels 140R of the spatial light modulator 140, the second region 150G is arranged to face the green pixels 140G, and the third region 150B is arranged to face the blue pixels 140B. To this end, the first region 150R, the second region 150G, and the third region 150B may extend in the Y direction, and the first region 150R, the second region 150G, and the third regions 150B may be repeatedly arranged one by one in the X direction. Accordingly, the first region 150R of the first beam deflector 150 may deflect red light in the Y direction, the second region 150G may deflect green light in the Y direction, and the third region 150B may deflect blue light in the Y direction.

The drive electrodes 153 of the first beam deflector 150 may include a plurality of first drive electrodes 153R (e.g., first group) arranged in the first region 150R, a plurality of second drive electrodes 153G (e.g., second group) arranged in the second region 150G, and a plurality of third drive electrodes 153B arranged in the third region 150B. The first drive electrodes 153R extend in the X direction in the first region 150R and are arranged at intervals in the Y direction. The second drive electrodes 153G and the third drive electrodes 153B also extend in the X direction in the second region 150G and the third region 150B, respectively, and are arranged at intervals in the Y direction.

Voltages may be independently applied to the first drive electrodes 153R, the second drive electrodes 153G, and the third drive electrodes 153B. In other words, voltages may be independently applied to each of the first drive electrodes 153R in the first region 150R, and voltages may be independently applied to each of the second drive electrodes 153G in the second region 150G, and voltages may be independently applied to each of the third drive electrodes 153B in the third region 150B. In addition, different electrical signals may be individually provided to each of the first region 150R, the second region 150G, and the third region 150B. Accordingly, signals having different spatial periods in the Y direction may be applied to the first drive electrodes 153R, the second drive electrodes 153G, and the third drive electrodes 153B.

For example, voltages may be applied to the first drive electrodes 153R, the second drive electrodes 153G, and the third drive electrodes 153B so that a ratio of a spatial period, in the Y direction, of a signal applied to the first drive electrodes 153R arranged in the first region 150R of the first beam deflector 150 to a wavelength of red light is approximately equal to a ratio of a spatial period, in the Y direction, of a signal applied to the second drive electrodes 153G arranged in the second region 150G to a wavelength of green light, and is also approximately equal to a ratio of a spatial period, in the Y direction, of a signal applied to the third drive electrodes 153B arranged in the third region 150B to a wavelength of blue light. As a result, a deflection angle, in the Y direction, of red light by the first region 150R, a deflection angle, in the Y direction, of green light by the second region 150G, and a deflection angle, in the Y direction, of blue light by the third region 150B may be equal to each other. Accordingly, an observer may hardly feel chromatic aberration in the Y direction in a holographic image.

Figure 5A:
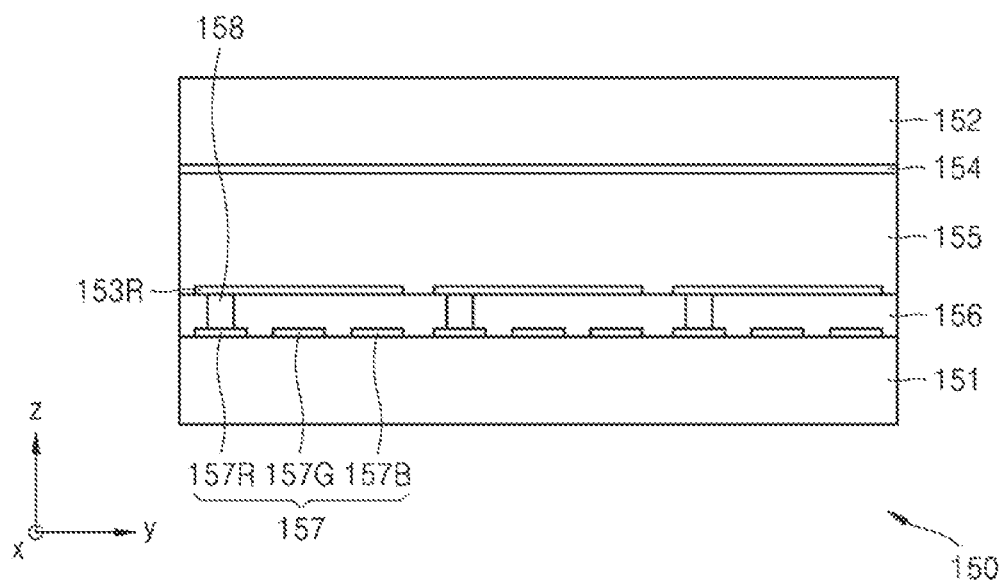
FIGS. 5A to 5C are cross-sectional views schematically showing structures of different regions of the first beam deflector corresponding to different pixels of the spatial light modulator.
Figure 5B:
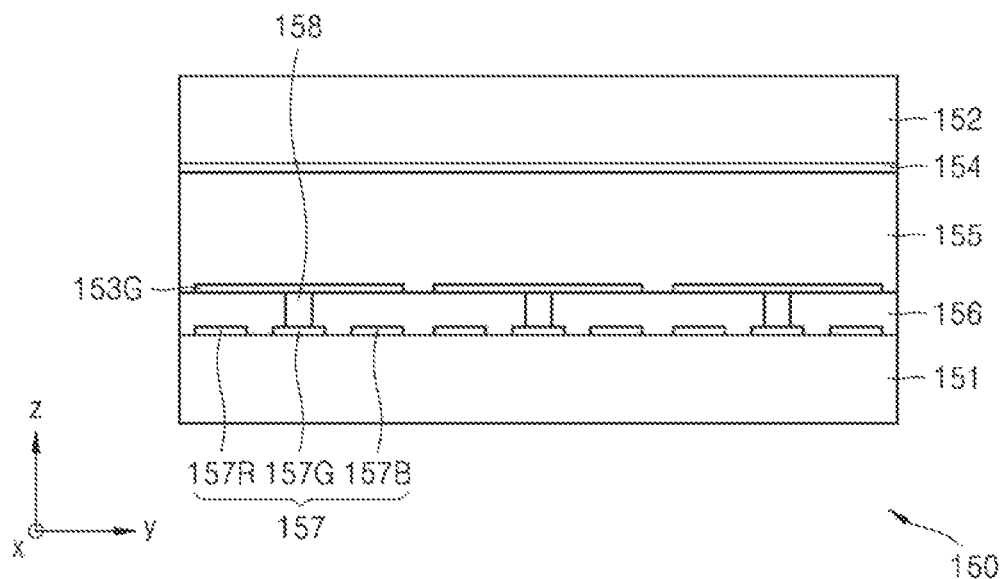
Figure 5C:
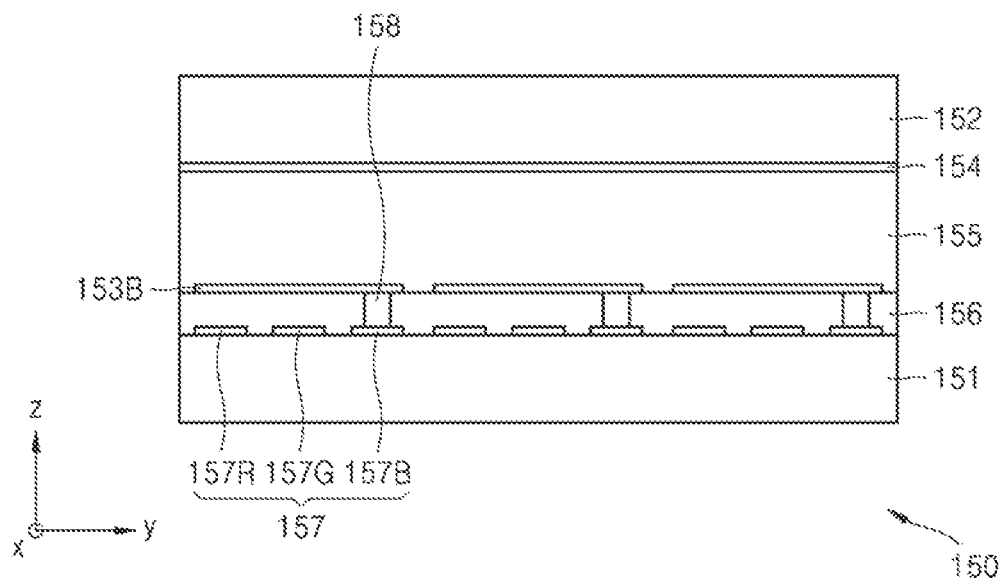

FIGS. 5A to 5C are cross-sectional views schematically showing regions of the first beam deflector 150 corresponding to different pixels of the spatial light modulator 140. For example, FIG. 5A is a cross-sectional view in the Y direction of the first region 150R, FIG. 5B is a cross-sectional view in the Y direction of the second region 150G, and FIG. 5C is a cross-sectional view in the Y direction of the third region 150B.

Referring to FIGS. 5A to 5C, the first beam deflector 150 may include a first substrate 151 and a second substrate 152 arranged to face each other. The first substrate 151 and the second substrate 152 may be made of a transparent material such as glass or a transparent polymer. The common electrode 154 may be arranged over the entire region of a lower surface of the second substrate 152. In addition, the first beam deflector 150 may include a plurality of connection electrodes 157 on an upper surface of the first substrate 151 and an interlayer insulating layer 156 that covers the first substrate 151 and the connection electrodes 157. The interlayer insulating layer 156 may be formed of a transparent insulating material, and a plurality of drive electrodes 153 (e.g., drive electrodes 153R, 153G, and 153B) may be arranged on the interlayer insulating layer 156. In addition, the first beam deflector 150 may further include a plurality of via holes 158 for electrically connecting the drive electrodes 153 to the connection electrodes 157. Each of the via holes 158 penetrates the interlayer insulating layer 156 in a vertical direction, that is, in the Z direction, and a conductive material connecting one of the drive electrodes 153 to one of the connection electrodes 157 is filled in each of the via holes 158.

The connection electrodes 157 may include a first connection electrode 157R connected to the first drive electrode 153R in the first region 150R, a second connection electrode 157G connected to the second drive electrode 153G in the second region 150G, and a third connection electrode 157B connected to the third drive electrode 153B in the third region 150B. The first connection electrode 157R, the second connection electrode 157G, and the third connection electrode 157B may each extend in the X direction and may each successively pass through each of the first region 150R, the second region 150G, and the third region 150B. The first connection electrode 157R, the second connection electrode 157G, and the third connection electrode 157B may be alternately arranged one by one in the Y direction.

Dimensions in the Y direction of the first connection electrode 157R, the second connection electrode 157G, and the third connection electrode 157B may be smaller than or equal to ⅓ of dimensions in the Y direction of the first drive electrode 153R, the second drive electrode 153G, and the third drive electrode 153B. Accordingly, a connection electrode group including the first connection electrode 157R, the second connection electrode 157G, and the third connection electrode 157B may be arranged to face the first drive electrode 153R, the second drive electrode 153G, or the third drive electrode 153B. For example, the first drive electrode 153R may be arranged to face all of the first connection electrode 157R, the second connection electrode 157G, and the third connection electrode 157B, in the first region 150R shown in FIG. 5A; the second drive electrode 153G may be arranged to face all of the first connection electrode 157R, the second connection electrode 157G, and the third connection electrode 157B, in the second region 150G shown in FIG. 5B; and the third drive electrode 153B may be arranged to face all of the first connection electrode 157R, the second connection electrode 157G, and the third connection electrode 157B, in the third region 150B shown in FIG. 5C.

As shown in FIGS. 5A to 5C, only the first connection electrode 157R is electrically connected to the first drive electrode 153R through the via hole 158, in the first region 150R, only the second connection electrode 157G is electrically connected to the second drive electrode 153G through the via hole 158, in the second region 150G, and only the third connection electrode 157B is electrically connected to the third drive electrode 153B through the via hole 158, in the third region 150B. To this end, a position of the via hole 158 within the regions 150R, 150G, and 150B may be changed depending on the first region 150R, the second region 150G, and the third region 150B. According to the configuration, an electrical signal provided from a drive circuit may be transmitted to the first drive electrode 153R through the first connection electrode 157R and may be transmitted to the second drive electrode 153G through the second connection electrode 157G and may be transmitted to the third drive electrode 153B through the third connection electrode 157B. In this way, voltages may be independently applied to the first drive electrode 153R, the second drive electrode 153G, and the third drive electrode 153B.

Figure 6:
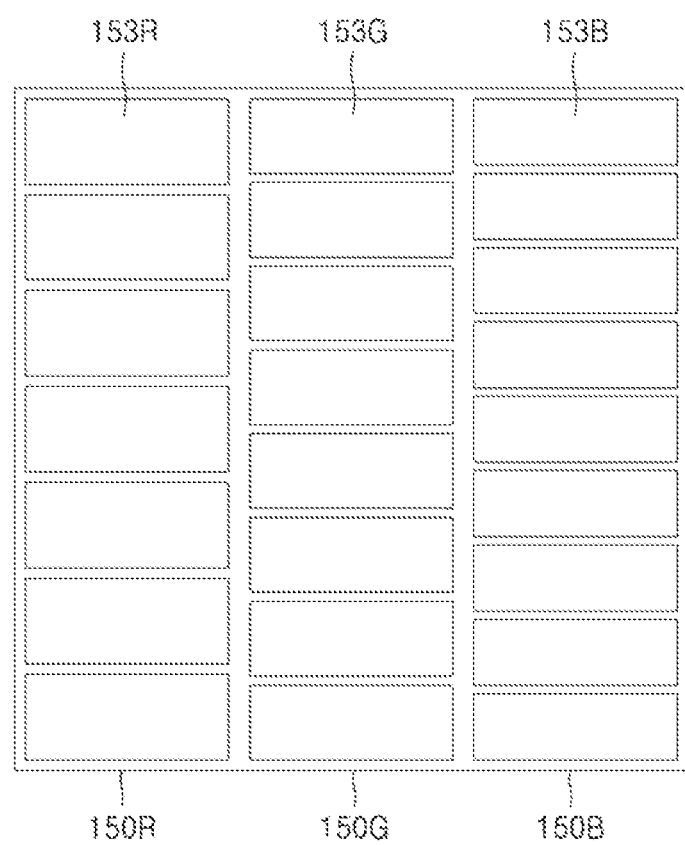
FIG. 6 shows an example of an arrangement of drive electrodes of a first beam deflector according to an embodiment.

FIG. 6 shows an example of an arrangement of drive electrodes of a first beam deflector according to an embodiment. In the embodiment shown in FIG. 4, the drive electrodes in the first region 150R, the second region 150G, and the third region 150B are all arranged in the same period in the Y direction. In the embodiment shown in FIG. 6, the drive electrodes in the first region 150R, the second region 150G, and the third region 150B may be arranged at different periods in the Y direction. In this case, when a wavelength of light deflected by each region is relatively long, an arrangement period of the drive electrodes in that region may be relatively long, and when the wavelength of the light deflected by each region is relatively short, the arrangement period of the drive electrodes in that region may be relatively short. For example, an arrangement period of the first drive electrodes 153R is the longest in the first region 150R for deflecting red light, and an arrangement period of the third drive electrodes 153B may be the shortest in the third region 150B for deflecting blue light. In particular, a ratio of the arrangement period (e.g., first arrangement period) of the first drive electrodes 153R to a wavelength of red light, a ratio of the arrangement period (e.g., second arrangement period) of the second drive electrodes 153G to a wavelength of green light, and a ratio of the arrangement period of the third drive electrodes 153B to a wavelength of blue light may be approximately equal to each other.

Figure 7:
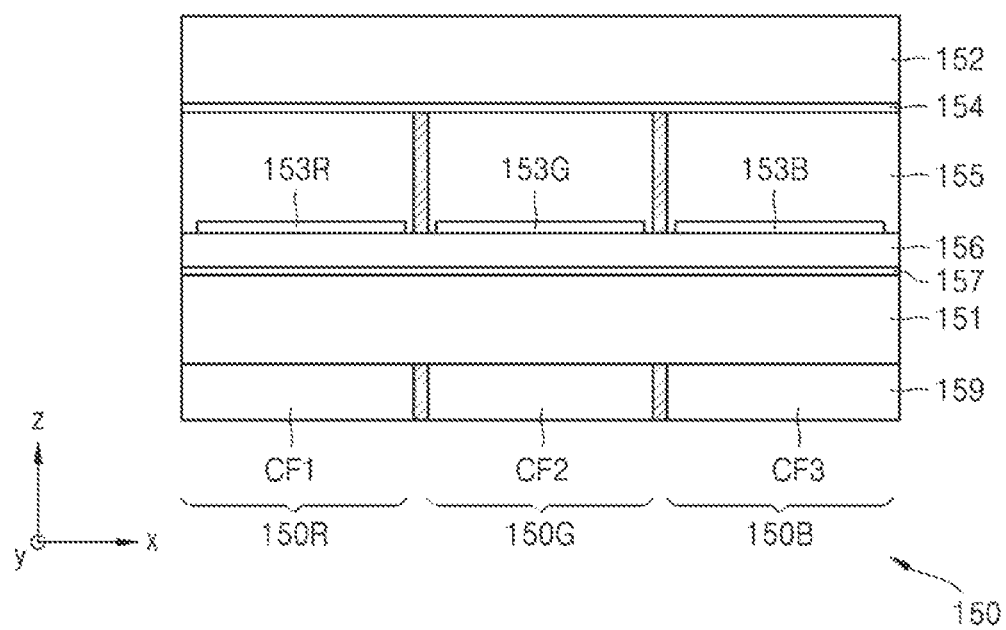
FIG. 7 is a cross-sectional view schematically showing a structure of the first beam deflector according to an embodiment.

FIG. 7 is a cross-sectional view schematically showing a structure of a first beam deflector according to an embodiment. The cross-sectional view of FIG. 7 shows a cross-section in the X direction unlike the cross-sectional views of FIGS. 5A to 5C, which are in the Y direction. Referring to FIG. 7, the first beam deflector 150 may further include a color filter layer 159. The color filter layer 159 (e.g., color filter) may further include a first color filter CF1 (e.g., first portion) for transmitting only red light (e.g., a first wavelength) therethrough, a second color filter CF2 (e.g., second portion) for transmitting only green light (e.g., a second wavelength) therethrough, and a third color filter CF3 for transmitting only blue light therethrough. The first color filter CF1 to the third color filter CF3 may be arranged in the first region 150R to the third region 150B, respectively, so that the first color filter CF1 faces the first drive electrode 153R, the second color filter CF2 faces the second drive electrode 153G, and the third color filter CF3 faces the third drive electrode 153B. Although FIG. 7 shows that the color filter layer 159 is arranged on a lower surface of the first substrate 151, this is only an example, and a position of the color filter layer 159 is not limited thereto. For example, the color filter layer 159 may also be arranged on an upper surface of the second substrate 152 or may be arranged between the first substrate 151 and the second substrate 152.

The color filter layer 159 may prevent light of a color that does not correspond to each region of the first beam deflector 150 from being incident on the region. For example, the color filter layer 159 may minimize noise generated when green or blue light is incident on the first region 150R, red or blue light is incident on the second region 150G, or green or red light is incident on the third region 150B. However, the color filter layer 159 of the first beam deflector 150 is not an essential component and may also be omitted when there is a small possibility that noise is generated.

Figure 8:
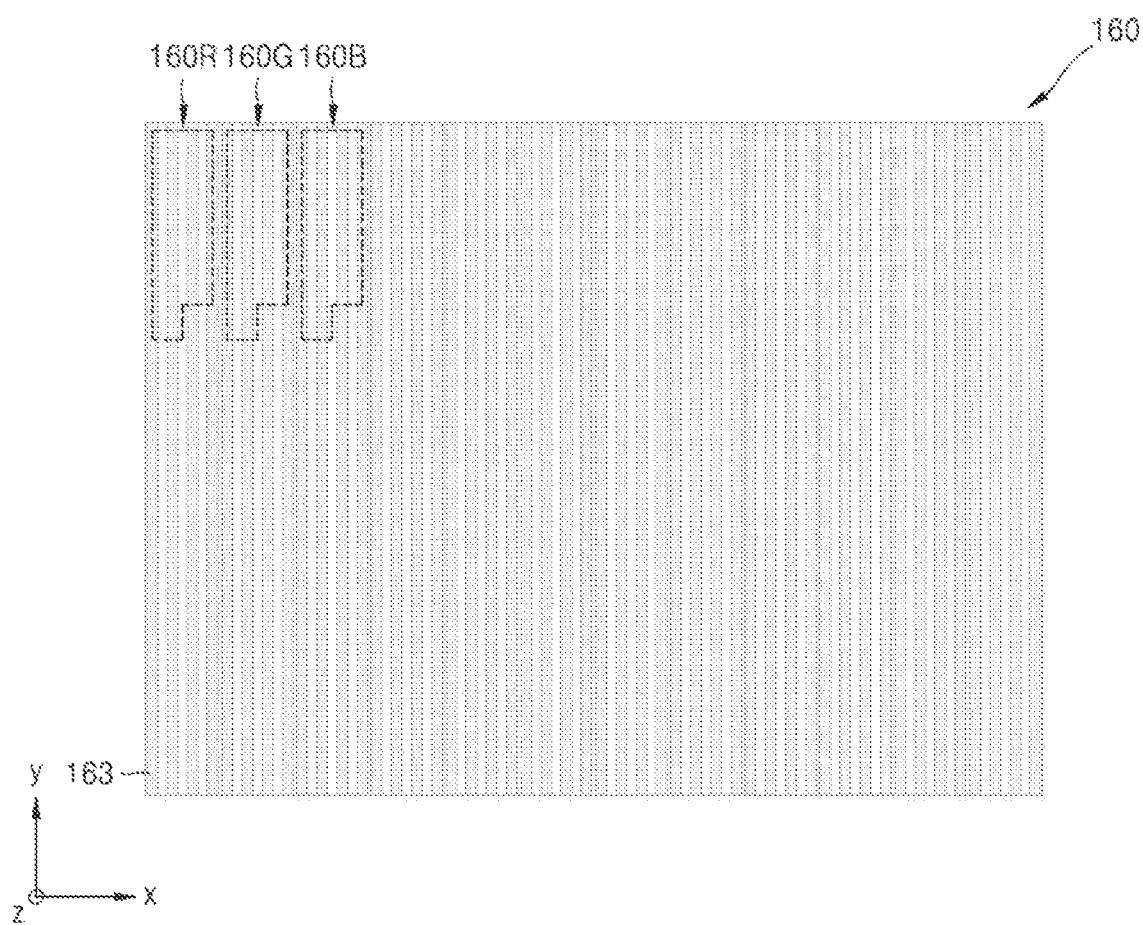
FIG. 8 shows an example of an arrangement of drive electrodes of a second beam deflector aligned with the pixel arrangement of the spatial light modulator shown in FIG. 3.

FIG. 8 shows an example of an arrangement of the drive electrodes of the second beam deflector aligned with the pixel arrangement of the spatial light modulator shown in FIG. 3. Referring to FIG. 8, the second beam deflector 160 may include a first region 160R, a second region 160G, and a third region 160B that correspond to and are arranged to face the red pixels 140R, the green pixels 140G, and the blue pixels 140B of the spatial light modulator 140. In other words, the first region 160R to the third region 160B of the second beam deflector 160 may be alternately arranged one by one in the X direction so that the first region 160R faces the red pixels 140R of the spatial light modulator 140, the second region 160G faces the green pixels 140G thereof, and the third region 160B faces the blue pixels 140B thereof. In addition, the first region 160R, the second region 160G, and the third region 160B may extend in the Y direction. Accordingly, the first region 160R of the second beam deflector 160 may deflect red light in the X direction, the second region 160G thereof may deflect green light in the X direction, and the third region 160B thereof may deflect blue light in the X direction.

Drive electrodes 163 of the second beam deflector 160 extend in the Y direction and are periodically arranged at regular intervals in the X direction. Some of the drive electrodes 163 may extend over the first region 160R in the Y direction, some of the drive electrodes 163 may extend over the second regions 160G in the Y direction, and some of the drive electrodes 163 may extend over the third region 160B in the Y direction. In this way, a plurality of the drive electrodes 163 of the second beam deflector 160 may be aligned with a pixel arrangement of the spatial light modulator 140.

The connection electrode 157 of the first beam deflector 150 extends over different types of regions, but the drive electrodes 163 of the second beam deflector 160 each extend over a single type of region. Accordingly, the second beam deflector 160 may apply different types of electrical signals to the drive electrodes 163 arranged in different regions. In other words, a first signal may be applied to the drive electrodes 163 in the first region 160R, and a second signal different from the first signal may be applied to the drive electrodes 163 in the second region 160G, and a third signal different from the first and second signals may be applied to the drive electrodes 163 in the third region 160B.

Figure 9:
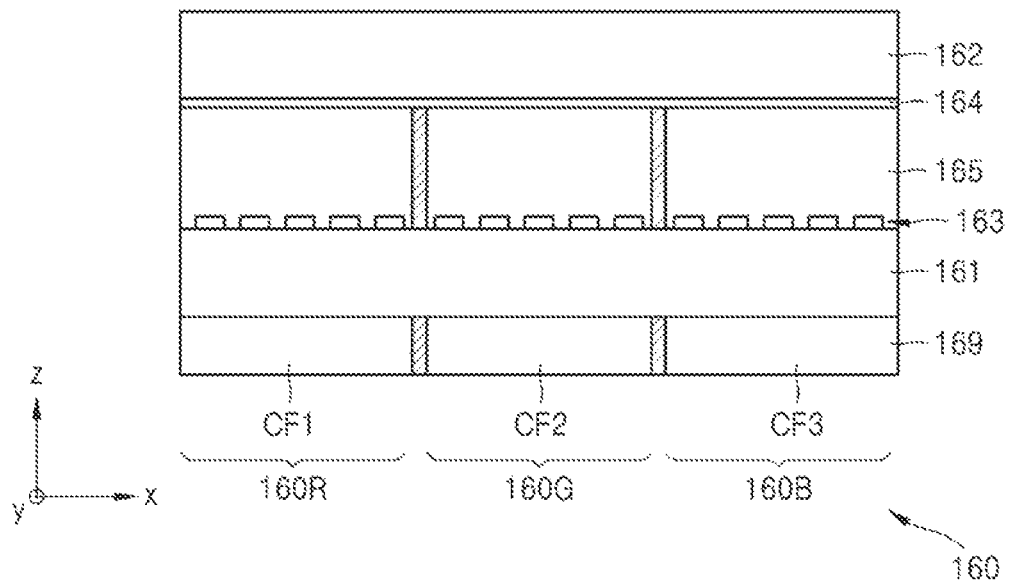
FIG. 9 is a cross-sectional view showing a schematic structure of a second beam deflector according to an embodiment.

FIG. 9 is a cross-sectional view showing a schematic structure of the second beam deflector according to an embodiment. FIG. 9 is a cross-sectional view of the second beam deflector 160 of FIG. 8, which is taken in the X direction. Referring to FIG. 9, the second beam deflector 160 may include a first substrate 161 and a second substrate 162 facing each other, drive electrodes 163 on an upper surface of the first substrate 161, a common electrode 164 on a lower surface of the second substrate 162, and a liquid crystal layer 165 between the first substrate 161 and the second substrate 162. The liquid crystal layer 165 may be divided into a first region 160R, a second region 160G, and a third region 160B of the second beam deflector 160. A plurality of drive electrodes 163 are arranged in each of the first region 160R, the second region 160G, and the third region 160B of the second beam deflector 160, respectively.

In addition, the second beam deflector 160 may further include a color filter layer 169. The color filter layer 169 may include a first color filter CF1 for transmitting only red light therethrough, a second color filter CF2 for transmitting only green light therethrough, and a third color filter CF3 for transmitting only blue light therethrough. The first color filter CF1 may be arranged in the first region 160R, the second color filter CF2 may be arranged in the second region 160G, and the third color filter CF3 may be arranged in the third region 160B. The color filter layer 169 may minimize noise generated when green or blue light is incident on the first region 160R of the second beam deflector 160, when red or blue light is incident on the second region 150G thereof, or when green or red light is incident on the third region 150B thereof. However, the color filter layer 169 of the second beam deflector 160 is not an essential component and may also be omitted when there is a small possibility that noise is generated.

Figure 10:
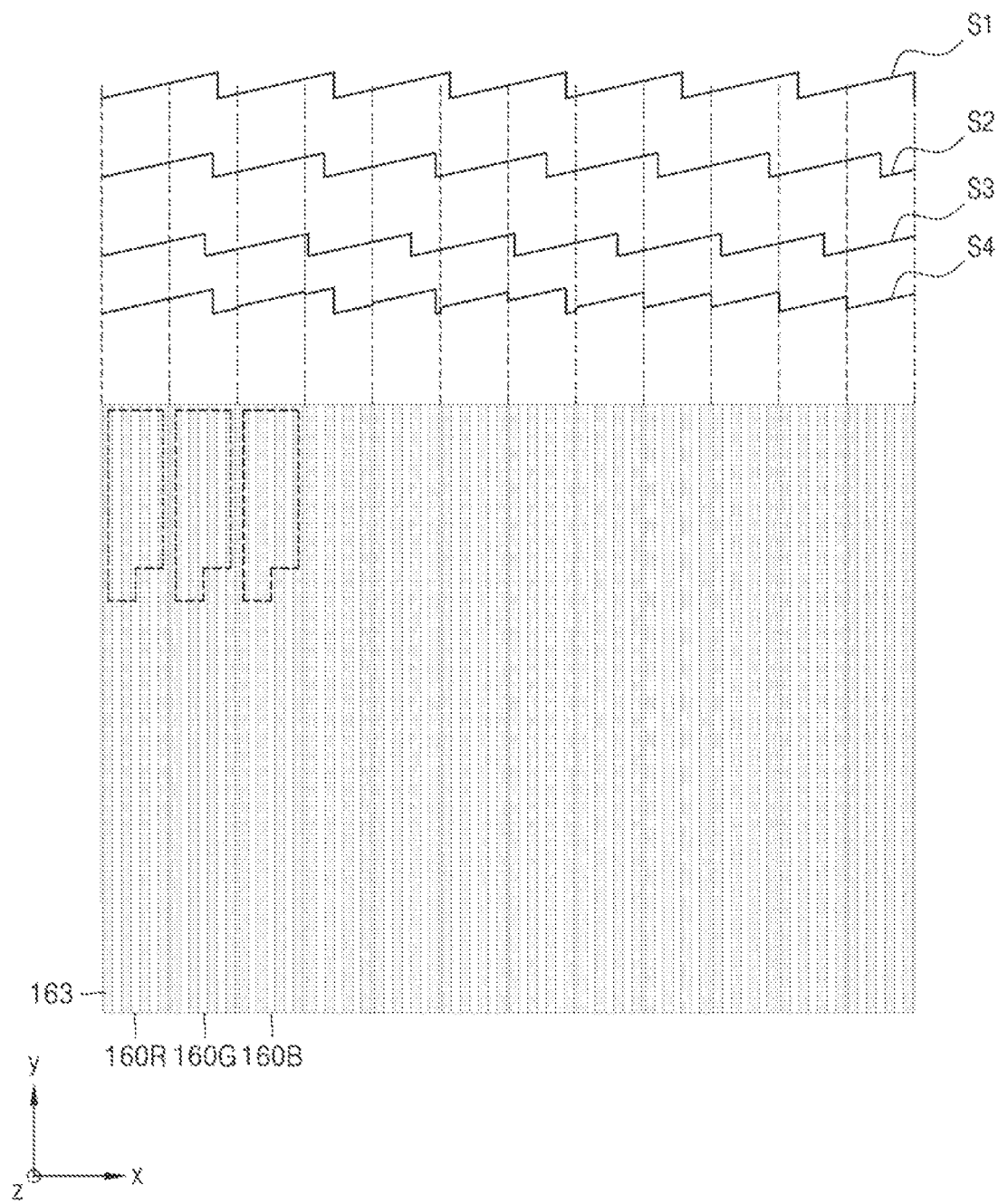
FIG. 10 shows an example of electrical signals applied to drive electrodes of the second beam deflector.

FIG. 10 shows an example of electrical signals applied to the drive electrodes of the second beam deflector. In a graph displayed at the top of FIG. 10, a first signal S1 (e.g., first voltage or first voltage pattern), a second signal S2 (e.g., second voltage or second voltage pattern), and a third signal S3 represent electrical signals applied to the drive electrodes 163 in the first region 160R to the third region 160B, respectively. A period of the first signal S1, a period of the second signal S2, and a period of the third signal S3 may be different from each other.

In order to reduce chromatic aberration, a ratio of a spatial period, in the X direction, of the first signal S1 (e.g., first spatial period) to a wavelength of red light may be approximately equal to a ratio of a spatial period, in the X direction, of the second signal S2 (e.g., second spatial period) to a wavelength of green light, and may also be approximately equal to a ratio of the spatial period, in the X direction, of the third signal S3 to a wavelength of blue light. As a result, a deflection angle, in the X direction, of red light by the first region 160R of the second beam deflector 160, a deflection angle, in the X direction, of green light by the second region 160G thereof, and a deflection angle, in the X direction, of blue light by the third region 160B thereof may be equal to each other. Accordingly, an observer may hardly feel chromatic aberration in the X direction in a holographic image.

For example, when a wavelength of red light is approximately 638 nm and a wavelength of green light is approximately 520 nm and a wavelength of blue light is approximately 460 nm, a spatial period, in the X direction, of the first signal S1 applied to the drive electrodes 163 in the first region 160R may be approximately 20.804 μm, a spatial period, in the X direction, of the second signal S2 applied to the drive electrodes 163 in the second region 160G may be approximately 16.957 μm, and a spatial period, in the X direction, of the third signal S3 applied to the drive electrodes 163 in the third region 160B may be approximately 15 μm. The numerical values described herein are not limited thereto, and actual periods of the first to third signals S1, S2, and S3 may be changed depending on the deflection angles of lights in the X direction.

An electrical signal S4 applied to all the drive electrodes 163 of the second beam deflector 160 may be obtained by spatially sampling the first to third signals S1, S2, and S3 corresponding to positions of the first to third regions 160R, 160G, and 160B, respectively. For example, the electrical signal S4 applied to all the drive electrodes 163 may be formed by spatially sampling a portion of the first signal S1 shown in FIG. 10 corresponding to positions in the X direction in the first regions 160R, and a portion of the second signal S2 corresponding to positions in the X direction in the second regions 160G, and a portion of the third signal S3 corresponding to positions in the X direction in the third regions 160B.

Referring to FIGS. 8 to 10, it is described that the plurality of drive electrodes 163 are periodically arranged at regular intervals in the X direction in the first region 160R, the second region 160G, and the third region 160B, and signals having different spatial periods are spatially sampled and applied to the plurality of drive electrodes 163. However, the disclosure is not limited thereto, and the drive electrodes 163 of the second beam deflector 160 may be arranged at different intervals depending on regions.

For example, an interval, in the X direction, between each of the drive electrodes 163 in the first region 160R, an interval, in the X direction, between each of the drive electrodes 163 in the second region 160G, and an interval, in the X direction, between each of the drive electrodes 163 in the third region 160B may be different from each other. In particular, a ratio of the interval in the X direction between the drive electrodes 163 in the first region 160R to a wavelength of red light, a ratio of the interval in the X direction between the drive electrodes 163 in the second region 160G to a wavelength of green light, and a ratio of the interval in the X direction between the drive electrodes 163 in the third region 160B to a wavelength of blue light may be the same as each other. In this case, it is not necessary to spatially sample signals having different periods.

In the holographic display apparatus 100 shown in FIG. 1, the binocular separation grating 120, the focusing lens 130, the spatial light modulator 140, the first beam deflector 150, and the second beam deflectors 160 are sequentially arranged in a propagation direction of illumination light. Accordingly, the spatial light modulator 140 is between the backlight unit 110 and the second beam deflector 160, and the first beam deflector 150 is between the spatial light modulator 140 and the second beam deflector 160. In this case, light modulated by the spatial light modulator 140 passes through the first beam deflector 150 to be deflected in the Y direction and then passes through the second beam deflector 160 to be deflected in the X direction. However, an arrangement order of optical elements is not limited thereto.

Figure 11:
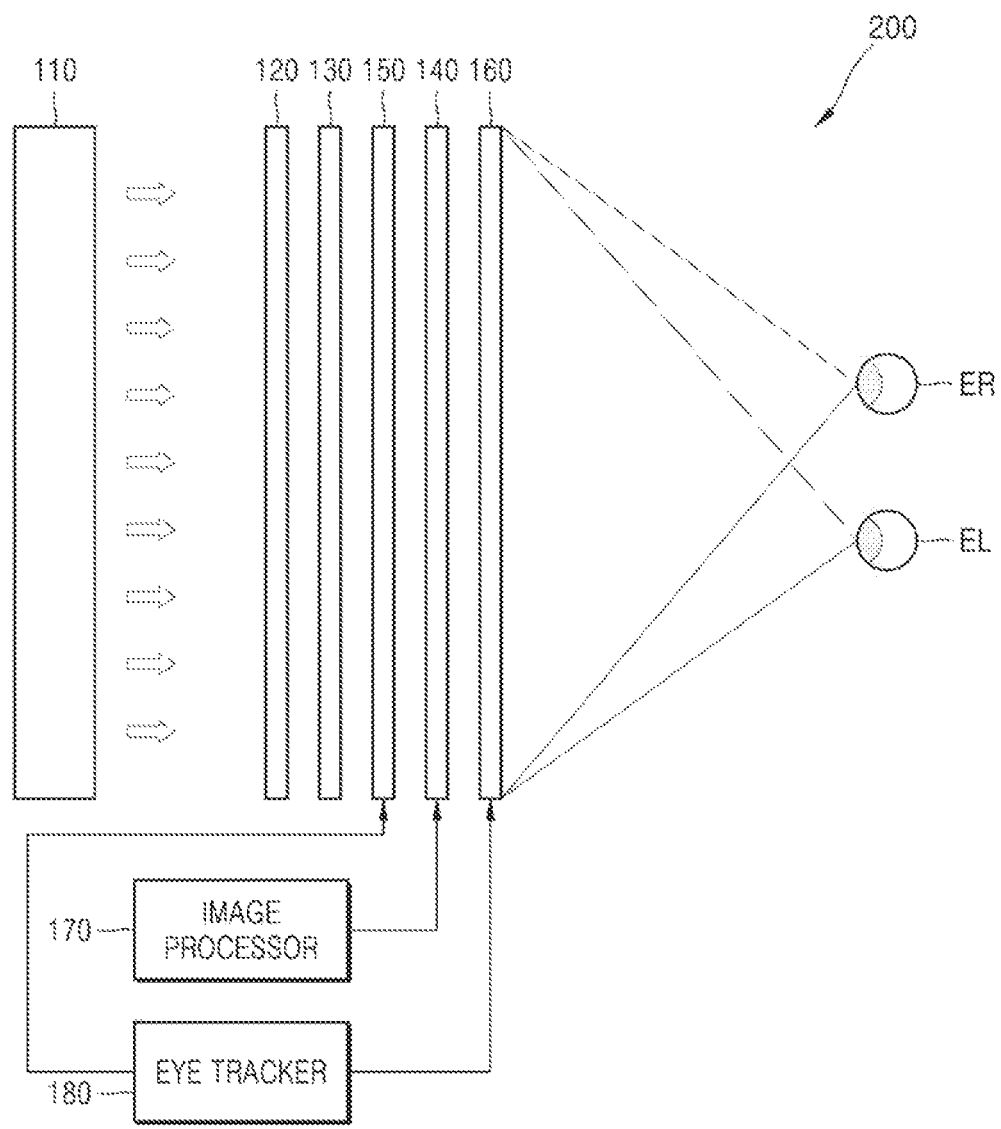
FIG. 11 is a configuration diagram schematically showing a configuration of a holographic display apparatus according to an embodiment.

FIG. 11 is a configuration diagram schematically showing a configuration of a holographic display apparatus according to an embodiment. Referring to FIG. 11, a holographic display apparatus 200 includes a backlight unit 110, a binocular separation grating 120, a focusing lens 130, a first beam deflector 150, a spatial light modulator 140, and a second beam deflector 160, which are sequentially arranged in a propagation direction of illumination light. Accordingly, the spatial light modulator 140 is between the backlight unit 110 and the second beam deflector 160, and the first beam deflector 150 is between the backlight unit 110 and the spatial light modulator 140. In this case, light deflected in the Y direction while passing through the first beam deflector 150 is then modulated by the spatial light modulator 140, and the light modulated by the spatial light modulator 140 is then deflected in the X direction while passing through the second beam deflector 160.

In the embodiments shown in FIGS. 1 and 11, the second beam deflector 160 that deflects light in the X direction is arranged farthest from the backlight unit 110. Because the first beam deflector 150 deflects light in the Y direction, light passing through the regions of the first beam deflector 150 may be incident on a corresponding pixel of the spatial light modulator 140 or a corresponding region of the second beam deflector 160. Accordingly, in the embodiment shown in FIGS. 1 and 11, the first region 150R of the first beam deflector 150, the red pixels 140R of the spatial light modulator 140, and the first region 160R of the second beam deflector 160 may be aligned to face each other in a straight line, and the second region 150G of the first beam deflector 150, the green pixels 140G of the spatial light modulator 140, and the second regions 160G of the second beam deflector 160 may be aligned to face each other in a straight line, and the third region 150B of the first beam deflector 150, the blue pixels 140B of the spatial light modulator 140, and the third region 160B of the second beam deflector 160 may be aligned to face each other in a straight line.

Figure 12:
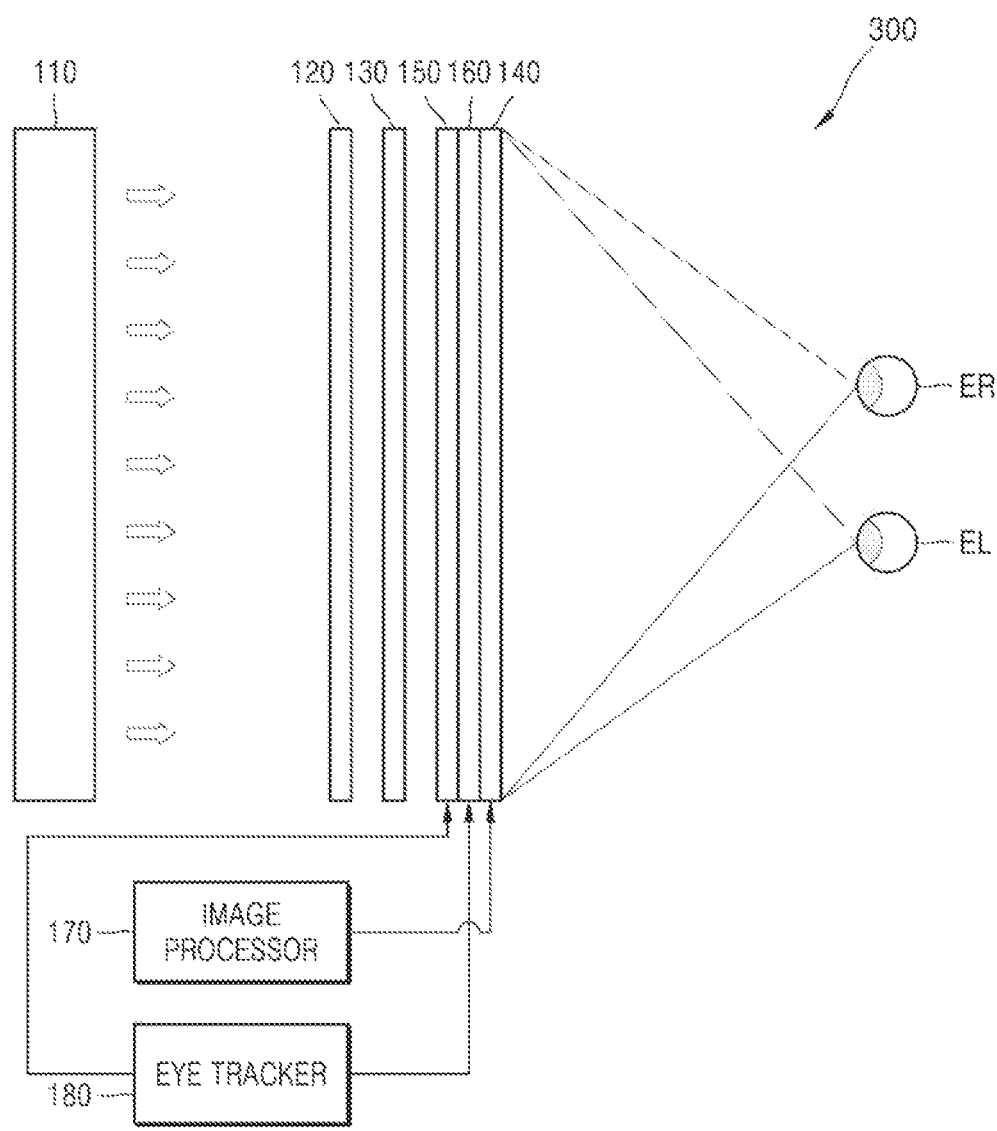
FIG. 12 is a configuration diagram schematically showing a configuration of a holographic display apparatus according to an embodiment.

However, when light modulated by the spatial light modulator 140 passes through another optical element, quality of a holographic image viewed by an observer may be reduced. Accordingly, the spatial light modulator 140 may be arranged farthest from the backlight unit 110 to increase the quality of the holographic image. For example, FIG. 12 is a configuration diagram schematically showing a configuration of a holographic display apparatus according to an embodiment. Referring to FIG. 12, a holographic display apparatus 300 includes a backlight unit 110, a binocular separation grating 120, a focusing lens 130, a first beam deflector 150, a second beam deflector 160, and a spatial light modulator 140, which are sequentially arranged in a propagation direction of illumination light. Accordingly, the first beam deflector 150 is between the backlight unit 110 and the spatial light modulator 140, and the second beam deflector 160 is between the first beam deflector 150 and the spatial light modulator 140.

In this case, light deflected in the X direction by the second beam deflector 160 is incident on the spatial light modulator 140, and thus, the second beam deflector 160 and the spatial light modulator 140 may be arranged to be in close contact with each other without an interval therebetween to minimize an influence of the second beam deflector 160. In addition, the first beam deflector 150 and the second beam deflector 160 may be arranged to be in close contact with each other without an interval therebetween to reduce a volume of the holographic display apparatus 300.

Figure 13:
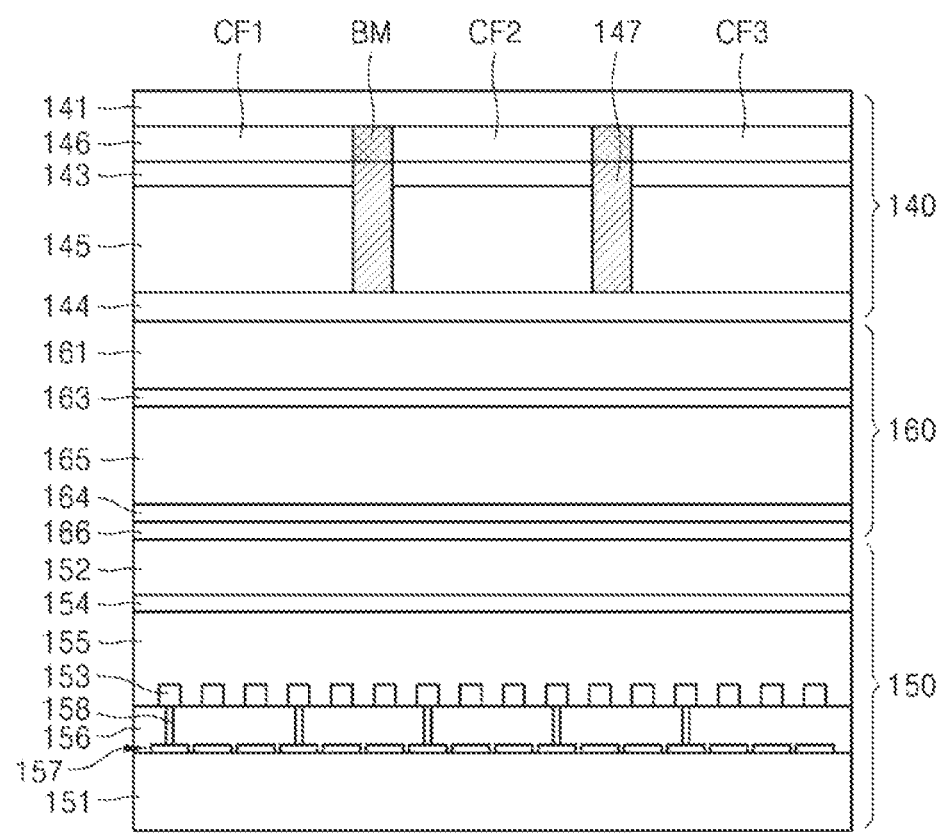
FIG. 13 shows an example of a structure in which a first beam deflector, a second beam deflector, and a spatial light modulator are integrally configured.

The first beam deflector 150, the second beam deflector 160, and the spatial light modulator 140 may be integrally manufactured through a common substrate. FIG. 13 shows an example of a structure in which the first beam deflector 150, the second beam deflector 160, and the spatial light modulator 140 are integrally configured. Referring to FIG. 13, the second substrate 152 of the first beam deflector 150 may serve as a second substrate of the second beam deflector 160. Accordingly, the second substrate 152 of the first beam deflector 150 becomes a common substrate of the first beam deflector 150 and the second beam deflector 160. The second beam deflector 160 may include a halfwave plate 166, a common electrode 164, a liquid crystal layer 165, a drive electrode 163, and a first substrate 161, which are sequentially arranged on an upper surface of the second substrate 152 of the first beam deflector 150. Because an alignment direction of the liquid crystal layer 165 of the second beam deflector 160 is rotated 90 degrees from an alignment direction of the liquid crystal layer 155 of the first beam deflector 150, the halfwave plate 166 may be arranged to rotate a polarization direction of light by 90 degrees. The halfwave plate 166 may not be arranged in the second beam deflector 160 but may be arranged in the first beam deflector 150. For example, the halfwave plate 166 may be between the common electrode 154 of the first beam deflector 150 and a lower surface of the second substrate 152.

In addition, the first substrate 161 of the second beam deflector 160 may serve as a lower substrate of the spatial light modulator 140. Accordingly, the first substrate 161 of the second beam deflector 160 becomes a common substrate of the second beam deflector 160 and the spatial light modulator 140. The spatial light modulator 140 may include a common electrode 144, a liquid crystal layer 145, a pixel electrode 143, a color filter layer 146, and an upper substrate 141, which are sequentially arranged on the first substrate 161 of the second beam deflector 160. The color filter layer 146 may include color filters CF1, CF2, and CF3 and a black matrix BM. The liquid crystal layer 145 may be divided by partition walls 147 for separating pixels.

Figure 14:
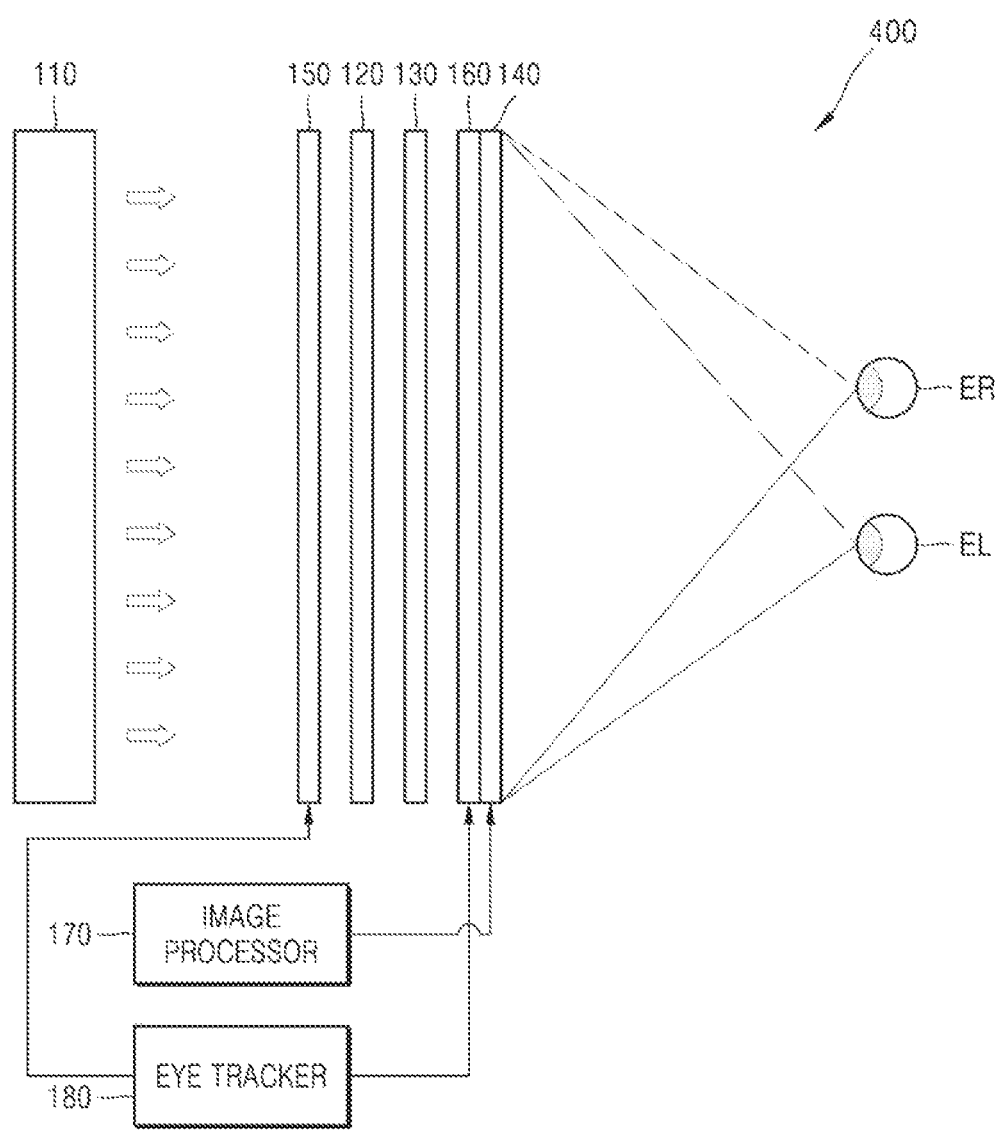
FIG. 14 is a configuration diagram schematically showing a configuration of a holographic display apparatus according to an embodiment.

FIG. 14 is a configuration diagram schematically showing a configuration of a holographic display apparatus according to an embodiment. Referring to FIG. 14, a holographic display apparatus 400 includes a backlight unit 110, a first beam deflector 150, a binocular separation grating 120, a focusing lens 130, a second beam deflector 160, and a spatial light modulator 140, which are sequentially arranged in a propagation direction of illumination light. An embodiment shown in FIG. 14 is similar to the embodiment shown in FIG. 12 in that the first beam deflector 150, the second beam deflector 160, and the spatial light modulator 140 are sequentially arranged, but the embodiment shown in FIG. 14 in which the binocular separation grating 120 and the focusing lens 130 are between the first beam deflector 150 and the second beam deflector 160 is different from the embodiment shown in FIG. 12 in which the binocular separation grating 120 and the focusing lens 130 are between the backlight unit 110 and the first beam deflector 150. In addition, in the embodiment shown in FIG. 14, the second beam deflector 160 and the spatial light modulator 140 may be arranged to be in close contact with each other without an interval therebetween to minimize an influence of the second beam deflector 160.

Figure 15:
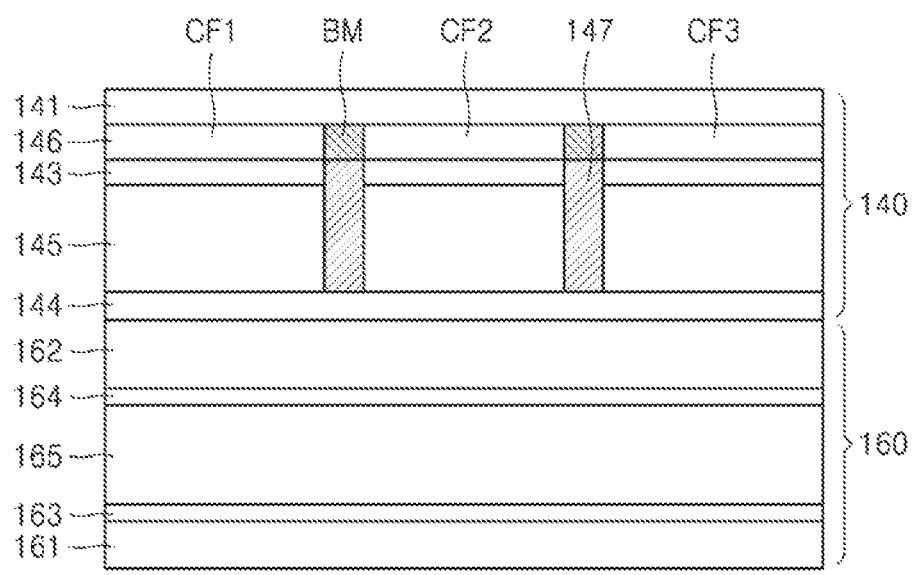
FIG. 15 shows an example of a structure in which a second beam deflector and a spatial light modulator are integrally configured.

The second beam deflector 160 and the spatial light modulator 140 may be integrally manufactured through a common substrate. FIG. 15 shows an example of a structure in which the second beam deflector 160 and the spatial light modulator 140 are integrally configured. Referring to FIG. 15, the second beam deflector 160 may include the drive electrode 163, the liquid crystal layer 165, the common electrode 164, and the second substrate 162, which are sequentially arranged on the first substrate 161. The spatial light modulator 140 is arranged on the second substrate 162 of the second beam deflector 160. Accordingly, the second substrate 162 of the second beam deflector 160 becomes a common substrate of the second beam deflector 160 and the spatial light modulator 140. A detailed structure of the spatial light modulator 140 is the same as the structure described in FIG. 13.

Figure 16:
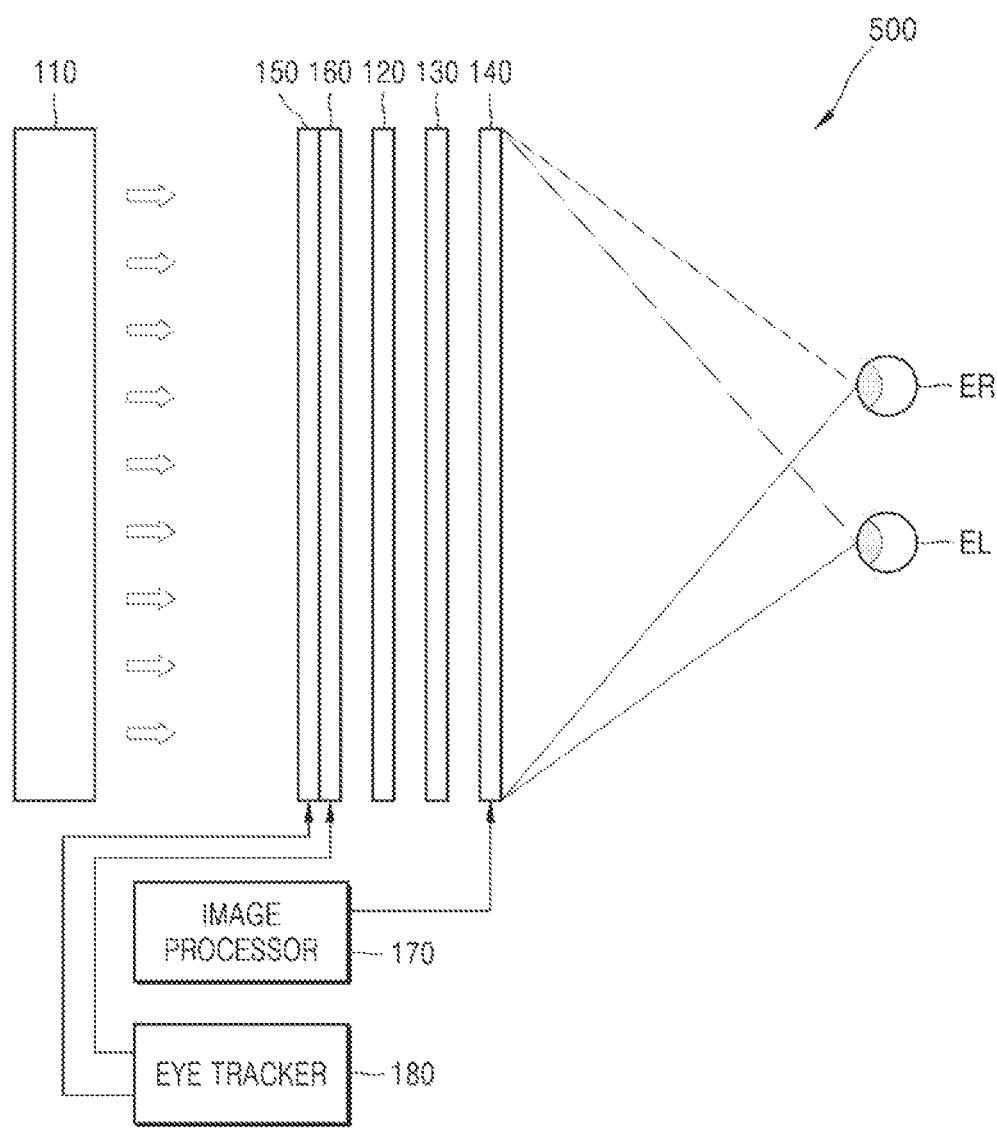
FIG. 16 is a configuration diagram schematically showing a configuration of a holographic display apparatus according to an embodiment.

FIG. 16 is a configuration diagram schematically showing a configuration of a holographic display apparatus according to an embodiment. Referring to FIG. 16, a holographic display apparatus 500 includes a backlight unit 110, a first beam deflector 150, a second beam deflector 160, a binocular separation grating 120, a focusing lens 130, and a spatial light modulator 140, which are sequentially arranged in a propagation direction of illumination light. An embodiment shown in FIG. 16 is similar to the embodiment shown in FIG. 12 in that the first beam deflector 150, the second beam deflector 160, and the spatial light modulator 140 are sequentially arranged but is different from the embodiment shown in FIG. 12 in that the binocular separation grating 120 and the focusing lens 130 are between the second beam deflector 160 and the spatial light modulator 140. In the embodiment shown in FIG. 16, the first beam deflector 150 and the second beam deflector 160 may be arranged to be in close contact with each other without an interval therebetween to reduce a volume of the holographic display apparatus 500.

Figure 17:
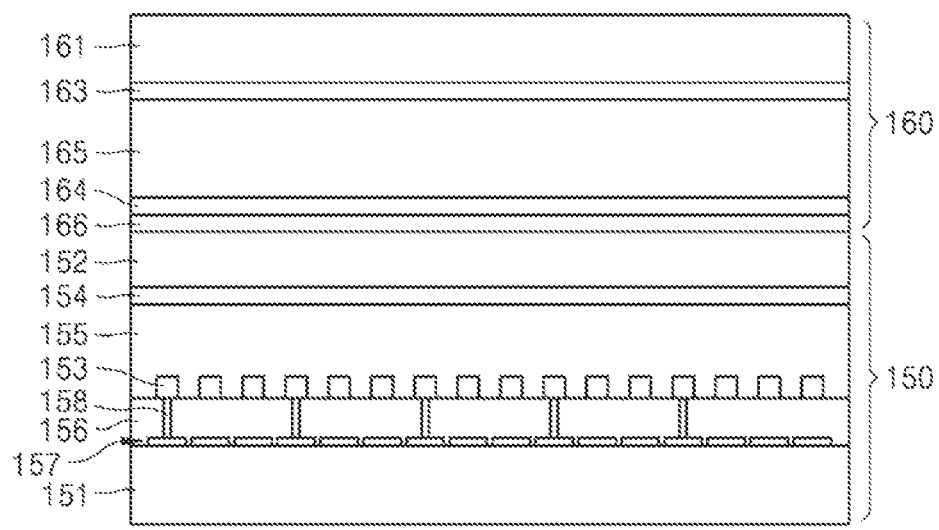
FIG. 17 shows an example of a structure in which a first beam deflector and a second beam deflector are integrally configured.

The first beam deflector 150 and the second beam deflector 160 may be integrally manufactured through a common substrate. FIG. 17 shows an example of a structure in which the first beam deflector 150 and the second beam deflector 160 are integrally configured. The structure shown in FIG. 17 is the same as the structure shown in FIG. 13 except that there is no spatial light modulator 140, and thus, detailed description thereof is omitted.

According to the holographic display apparatuses 300, 400, and 500 shown in FIGS. 12, 14, and 16, respectively, a position in the X direction in the spatial light modulator 140 on which light passing through the second beam deflector 160 is incident may be changed depending on deflection angles in the X direction adjusted by the second beam deflector 160. Accordingly, when the first region 160R, the second region 160G, and the third region 160B of the second beam deflector 160 are fixed, the red pixel 140R, the green pixel 140G, and the blue pixel 140B of the spatial light modulator 140 may be hard to accurately match the first region 160R, the second region 160G, and the third region 160B of the second beam deflector 160. Accordingly, positions, in the X direction, of the first region 160R, the second region 160G, and the third region 160B of the second beam deflector 160 may dynamically change with the deflection angles in the X direction.

Figure 18:
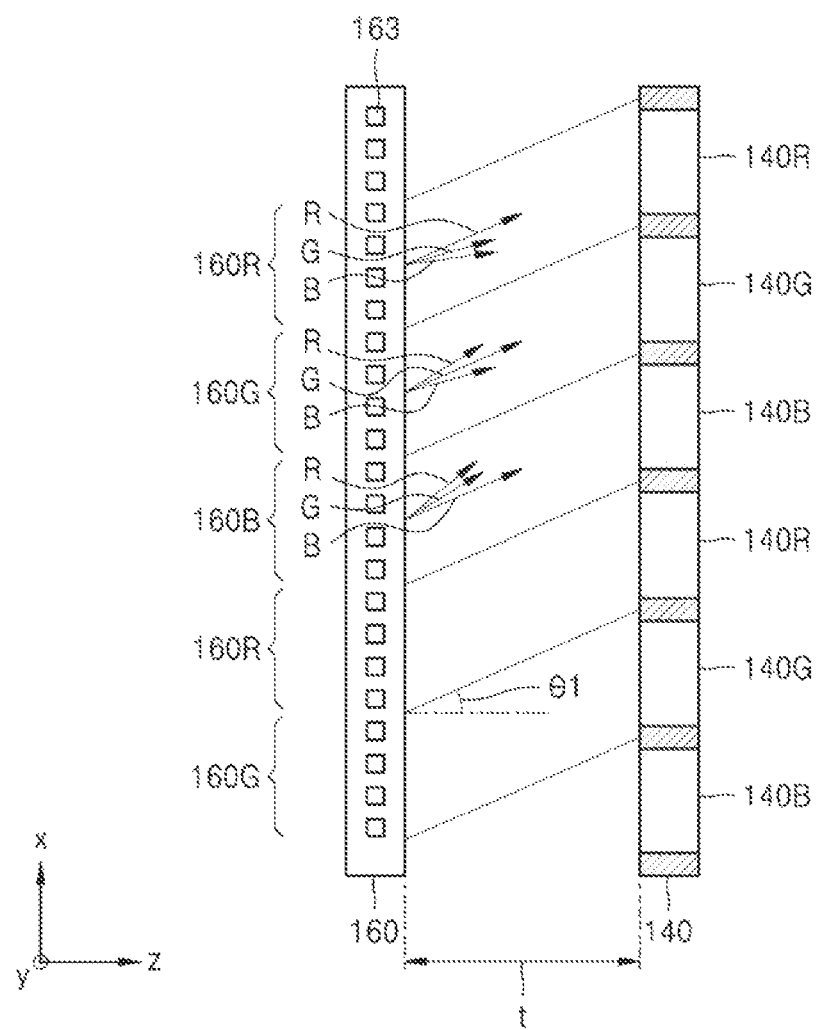
FIGS. 18 and 19 show examples of an operation of dynamically changing positions of regions of the second beam deflector respectively corresponding to pixels of the spatial light modulator.
Figure 19:
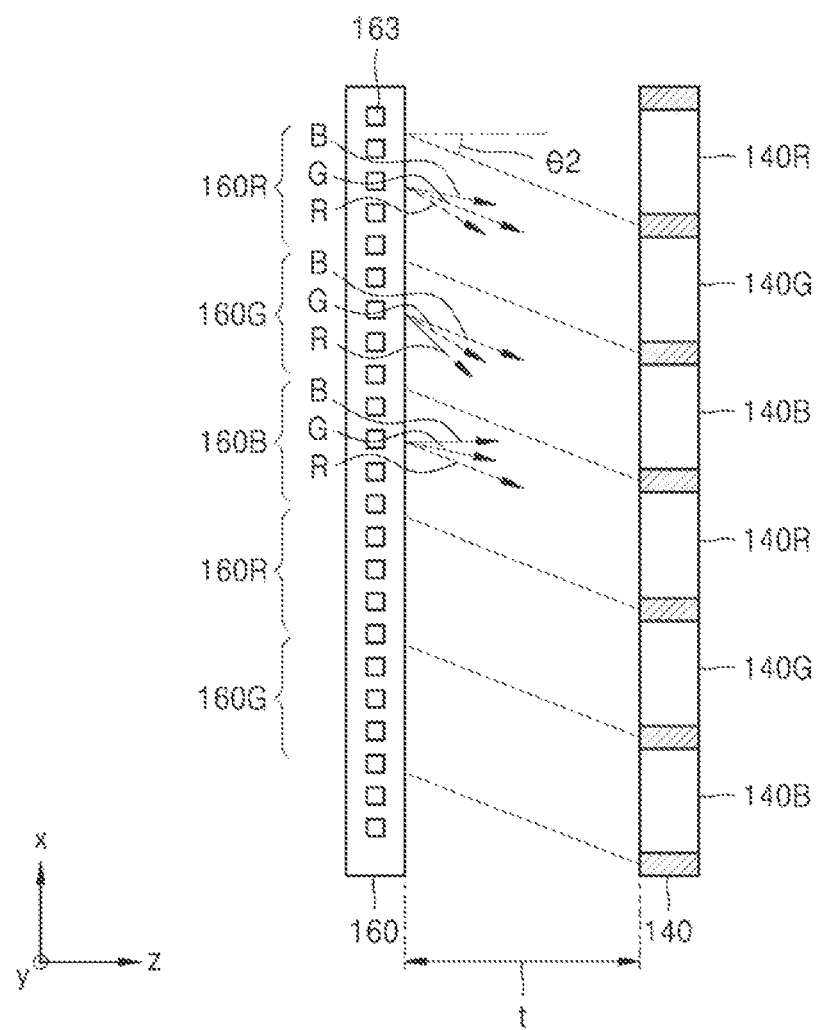

FIGS. 18 and 19 show examples of an operation of dynamically changing positions of regions of the second beam deflector 160 corresponding to pixels of the spatial light modulator 140, respectively. Referring to FIG. 18, when the deflection angle of light in the X direction adjusted by the second beam deflector 160 is θ1, a region, in the X direction, of the second beam deflector 160 corresponding to the red pixels 140R of the spatial light modulator 140 that is shifted by a distance corresponding to the angle of θ1 may be determined as the first region 160R of the second beam deflector 160. A region, in the X direction, of the second beam deflector 160 corresponding to the green pixels 140G of the spatial light modulator 140 that is shifted by a distance corresponding to the angle of θ1 may be determined as the second region 160G of the second beam deflector 160. A region, in the X direction, of the second beam deflector 160 corresponding to the blue pixels 140B of the spatial light modulator 140 that is shifted by a distance corresponding to the angle of θ1 may be determined as the third region 160B of the second beam deflector 160. In other words, a region in the X direction where red light deflected by the second beam deflector 160 is incident on the red pixels 140R of the spatial light modulator 140 at the angle of θ1 is determined as the first region 160R of the second beam deflector 160, and a region in the X direction where green light deflected by the second beam deflector 160 is incident on the green pixels 140G of the spatial light modulator 140 at the angle of θ1 is determined as the second region 160G of the second beam deflector 160, and a region in the X direction where blue light deflected by the second beam deflector 160 is incident on the blue pixels 140B of the spatial light modulator 140 at the angle of θ1 is determined as the third region 160B of the second beam deflector 160, respectively. The electrical signal S4 may be applied to the first region 160R, the second region 160G, and the third region 160B of the second beam deflector 160, which are determined as described above, in the manner described in FIG. 10. Light deflected at angles different from the angle θ1 may be blocked by a color filter or a black matrix in the spatial light modulator 140.

In addition, referring to FIG. 19, when the deflection angle of light in the X direction adjusted by the second beam deflector 160 is −θ2, a region, in the X direction, of the second beam deflector 160 corresponding to the red pixels 140R of the spatial light modulator 140 that is shifted by a distance corresponding to the angle of −θ2 may be determined as the first region 160R of the second beam deflector 160. A region, in the X direction, of the second beam deflector 160 corresponding to the green pixels 140G of the spatial light modulator 140 that is shifted by a distance corresponding to an angle of −θ2 may be determined as the second region 160G of the second beam deflector 160. A region, in the X direction, of the second beam deflector 160 corresponding to the blue pixels 140B of the spatial light modulator 140 that is shifted by a distance corresponding to the angle of −θ2 may be determined as the third region 160B of the second beam deflector 160. In this way, the positions, in the X direction, of the first region 160R, the second region 160G, and the third region 160B of the second beam deflector 160 may dynamically change with the deflection angle of light in the X direction adjusted by the second beam deflector 160 to match the positions of the red pixels 140R, the green pixels 140G, and the blue pixels 140B of the spatial light modulator 140 regardless of the deflection angles of light in the X direction.

Although the beam deflection apparatus and the holographic display apparatus including the same described above are described with reference to embodiments shown in the drawings, these are only examples and those skilled in the art will understand that various modifications and equivalent other embodiments may be made therefrom. Therefore, the disclosed embodiments should be considered from a descriptive point of view rather than a restrictive point of view. The scope of rights is indicated in the claims rather than the above description, and all differences within the same scope should be construed as being included in the scope of rights.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A beam deflection apparatus comprising:
   a first beam deflector comprising a first region that deflects light of a first wavelength in a first direction and a second region that deflects light of a second wavelength in the first direction; and
   a second beam deflector comprising a third region that deflects the light of the first wavelength in a second direction and a fourth region that deflects the light of the second wavelength in the second direction, the second direction being perpendicular to the first direction,
   wherein the first beam deflector comprises a plurality of first drive electrodes and a plurality of second drive electrodes in the first region and the second region, respectively, and
   wherein a ratio of a spatial period of a signal applied to the plurality of first drive electrodes to the first wavelength is the same as a ratio of a spatial period of a signal applied to the plurality of second drive electrodes to the second wavelength.

2. The beam deflection apparatus of claim 1,
   wherein the plurality of first drive electrodes extends in the second direction and is arranged at intervals in the first direction, and the plurality of second drive electrodes extends in the second direction and is arranged at intervals in the first direction, and
   wherein a first voltage is independently applied to the plurality of first drive electrodes and a second voltage is independently applied to the plurality of second drive electrodes.

3. The beam deflection apparatus of claim 1,
   wherein the first beam deflector comprises a plurality of the first regions and a plurality of the second regions which are alternately arranged in the second direction, and
   wherein each of the plurality of first regions and each of the plurality of second regions extend in the first direction in the first beam deflector.

4. The beam deflection apparatus of claim 1, wherein the first beam deflector further comprises:
   a substrate;
   a plurality of connection electrodes arranged on the substrate; and
   an interlayer insulating layer arranged to cover the substrate and the plurality of connection electrodes,
   wherein the plurality of first drive electrodes and the plurality of second drive electrodes are arranged on the interlayer insulating layer.

5. The beam deflection apparatus of claim 4, wherein the plurality of connection electrodes extends in the second direction over the first region and the second region of the first beam deflector and is arranged in the first direction.

6. The beam deflection apparatus of claim 4, wherein the plurality of connection electrodes comprises a plurality of first connection electrodes connected to the plurality of first drive electrodes and a plurality of second connection electrodes connected to the plurality of second drive electrodes, and
   wherein the plurality of first connection electrodes and the plurality of second connection electrodes are alternately arranged in the first direction.

7. The beam deflection apparatus of claim 6, wherein one of the plurality of first drive electrodes faces one of the plurality of first connection electrodes and one of the plurality of second connection electrodes, and
   wherein one of the plurality of second drive electrodes faces one of the plurality of first connection electrodes and one of the plurality of second connection electrodes.

8. The beam deflection apparatus of claim 7,
   wherein the first beam deflector further comprises a plurality of via holes penetrating the interlayer insulating layer, each of the plurality of via holes electrically connecting one of the plurality of first drive electrodes and the plurality of second drive electrodes to one of the plurality of first connection electrodes and the plurality of second connection electrodes, and
   wherein each of the plurality of first connection electrodes is electrically connected to the plurality of first drive electrodes through the plurality of via holes in the first region of the first beam deflector without being electrically connected to any of the plurality of second drive electrodes, and each of the plurality of second connection electrodes is electrically connected to the plurality of second drive electrodes through the plurality of via holes in the second region of the first beam deflector without being electrically connected to any of the plurality of first drive electrodes.

9. The beam deflection apparatus of claim 1,
wherein a first arrangement period of the plurality of first drive electrodes in the first direction is different from a second arrangement period of the plurality of second drive electrodes in the first direction, and
wherein a ratio of the first arrangement period to the first wavelength is the same as a ratio of the second arrangement period to the second wavelength.

10. The beam deflection apparatus of claim 1,
wherein the second beam deflector comprises a plurality of third drive electrodes extending in the first direction and arranged at intervals in the second direction, and
wherein a ratio of a spatial period of a signal applied to the plurality of third drive electrodes arranged in the third region to the first wavelength is the same as a ratio of a spatial period of a signal applied to the plurality of third drive electrodes arranged in the fourth region to the second wavelength.

11. The beam deflection apparatus of claim 10, wherein the second beam deflector comprises a plurality of the third regions and a plurality of the fourth regions which are alternately arranged in the second direction,
wherein the plurality of third regions and the plurality of fourth regions extend in the first direction, and
wherein some of the plurality of third drive electrodes are arranged in the plurality of third regions and some of the plurality of third drive electrodes are arranged in the plurality of fourth regions.

12. The beam deflection apparatus of claim 11,
wherein a first signal having a first period is applied to the plurality of third drive electrodes arranged in the plurality of third regions, and a second signal having a second period different from the first period is applied to the plurality of third drive electrodes arranged in the plurality of fourth regions, and
wherein a ratio of the first period to the first wavelength is the same as a ratio of the second period to the second wavelength.

13. The beam deflection apparatus of claim 1, further comprising:
a common substrate; and
a halfwave plate,
wherein the first beam deflector is arranged on a first surface of the common substrate, and the second beam deflector is arranged on a second surface of the common substrate facing the first surface, and
wherein the halfwave plate is arranged on the first surface of the common substrate or the second surface of the common substrate.

14. The beam deflection apparatus of claim 1, wherein at least one of the first beam deflector and the second beam deflector further comprises a first color filter arranged in the first region or the third region, respectively, that transmits only light of the first wavelength and a second color filter arranged in the second region or the fourth region, respectively, that transmits only light of the second wavelength.

* * * * *